US012627040B2

(12) United States Patent
Wu et al.

(10) Patent No.: US 12,627,040 B2
(45) Date of Patent: May 12, 2026

(54) ANTENNA MODULE

(71) Applicant: ACCTON TECHNOLOGY CORPORATION, Hsinchu (TW)

(72) Inventors: Chien-Hua Wu, Miaoli County (TW); Chun-Yi Kuo, Hsinchu (TW)

(73) Assignee: ACCTON TECHNOLOGY CORPORATION, Hsinchu (TW)

(*) Notice: Subject to any disclaimer, the term of this patent is extended or adjusted under 35 U.S.C. 154(b) by 180 days.

(21) Appl. No.: 18/586,584

(22) Filed: Feb. 26, 2024

(65) Prior Publication Data

US 2025/0105501 A1 Mar. 27, 2025

(30) Foreign Application Priority Data

Sep. 21, 2023 (CN) ........................ 202322570302.X

(51) Int. Cl.
*H01Q 1/52* (2006.01)
*H01Q 19/10* (2006.01)

(52) U.S. Cl.
CPC ............. *H01Q 1/521* (2013.01); *H01Q 1/526* (2013.01); *H01Q 19/104* (2013.01)

(58) Field of Classification Search
CPC ....................... H01Q 1/52-525; H01Q 19/104
See application file for complete search history.

(56) References Cited

U.S. PATENT DOCUMENTS

| | | | | |
|---|---|---|---|---|
| 6,624,789 | B1 * | 9/2003 | Kangasvieri | H01Q 1/243 343/702 |
| 6,791,498 | B2 * | 9/2004 | Boyle | H01Q 21/28 343/702 |
| 7,289,068 | B2 * | 10/2007 | Fujio | H01Q 9/0407 343/846 |
| 7,446,714 | B2 * | 11/2008 | Biddulph | H01Q 21/205 343/893 |
| 7,928,923 | B2 * | 4/2011 | Udagawa | H01Q 1/525 343/841 |
| 8,493,274 | B2 * | 7/2013 | Raura | H01Q 1/44 343/702 |

(Continued)

FOREIGN PATENT DOCUMENTS

| | | | | |
|---|---|---|---|---|
| EP | 3073570 | A1 * | 9/2016 | H01Q 1/243 |
| GB | 2458492 | A * | 9/2009 | H01Q 9/40 |
| WO | WO-2014206110 | A1 * | 12/2014 | H01Q 1/521 |

*Primary Examiner* — Ab Salam Alkassim, Jr.
(74) *Attorney, Agent, or Firm* — Apex Juris, pllc; Hilde M. L. Coeckx

(57) ABSTRACT

An antenna module includes two antennas, a reflecting board, and a plurality of extending plates. The extending plate has a first surface and a second surface. The first surface extends along a first axis and a second axis perpendicular to the first axis. The two antennas are disposed on the first surface and spaced along the first axis. A spacing zone is defined in the reflecting board and located between the two antennas along the first axis. The spacing zone has a shielding portion. A periphery of the shielding portion has a plurality of open grooves. Each open groove penetrates through the first surface and the second surface. The shielding portion has a plurality of side edges, wherein each side edge is adjacent to each open groove. Each extending plate extends towards the second surface. The shielding portion and the extending plates jointly form a shielding cover.

18 Claims, 27 Drawing Sheets

(56) References Cited

U.S. PATENT DOCUMENTS

| | | | | |
|---|---|---|---|---|
| 8,884,835 | B2 * | 11/2014 | Pelosi | H01Q 1/48<br>343/702 |
| 8,933,842 | B2 * | 1/2015 | Ayatollahi | H01Q 21/28<br>343/700 MS |
| 9,013,358 | B2 * | 4/2015 | Hsu | H01Q 1/48<br>343/702 |
| 9,614,276 | B2 * | 4/2017 | Pinto | H01Q 1/243 |
| 9,786,980 | B2 * | 10/2017 | Ku | H01Q 21/28 |
| 2010/0238072 | A1 * | 9/2010 | Ayatollahi | H01Q 21/28<br>343/700 MS |
| 2010/0238079 | A1 * | 9/2010 | Ayatollahi | H01Q 1/521<br>343/729 |
| 2013/0069837 | A1 * | 3/2013 | Cozzolino | H01Q 13/10<br>343/727 |
| 2013/0088400 | A1 * | 4/2013 | Chen | H01Q 1/521<br>343/770 |
| 2013/0120201 | A1 * | 5/2013 | Park | H01Q 1/48<br>343/749 |
| 2014/0043201 | A1 * | 2/2014 | Pelosi | H01Q 21/28<br>343/848 |
| 2015/0002367 | A1 * | 1/2015 | Kosaka | H01Q 1/48<br>343/893 |
| 2016/0218441 | A1 * | 7/2016 | Tian | H01Q 1/521 |
| 2016/0226139 | A1 * | 8/2016 | Yu | H01Q 9/42 |
| 2016/0240930 | A1 * | 8/2016 | Cozzolino | H01Q 21/28 |
| 2017/0085007 | A1 * | 3/2017 | Wu | H01Q 1/521 |
| 2017/0271759 | A1 * | 9/2017 | Liu | H01Q 9/42 |
| 2018/0175503 | A1 * | 6/2018 | Liu | H01Q 3/247 |
| 2020/0295454 | A1 * | 9/2020 | Yun | H01Q 1/50 |
| 2022/0336958 | A1 * | 10/2022 | Hwang | H01Q 13/10 |

* cited by examiner

ANTENNA MODULE

BACKGROUND OF THE INVENTION

Technical Field

The present disclosure relates generally to an antenna module of a wireless equipment, and more particularly to an antenna module which could be a shielding cover of an electronic component and an antenna module which could enhance an isolation between two antennas.

Description of Related Art

Wireless communication has been an indispensable part of a modern society and includes a mobile phone, a wireless internet, and so on. However, when an electronic component of a wireless equipment is disposed in a location near an antenna, a radio frequency (RF) could be leaked, which affects a receiving efficiency of the antenna or an emission efficiency of the antenna.

A conventional wireless equipment 100 is illustrated in FIG. 1 and includes a circuit board 100*a*, an electronic component 100*b* (such as an integrated circuit), an antenna module 100*c* which is located above the electronic component 100*b*, and a shielding structure 100*d*. The shielding structure 100*d* includes a shielding frame 100*e* and a shielding cover 100*f*, wherein the shielding frame 100*e* is disposed on the circuit board 100*a* and surrounds a periphery of the electronic component 100*b*. A top of the shielding frame 100*e* is open. A thermal pad 100*i* is disposed on a top of the electronic component 100*b*. The shielding cover 100*f* includes a top plate 100*g* and a plurality of extending plates 100*h*, wherein the extending plates 100*h* are connected to a periphery of the top plate 100*g*. The shielding cover 100*f* covers the shielding frame 100*e*. The top plate 100*g* closes the top of the shielding frame 100*e* and is in contact with the thermal pad 100*i*. The extending plate 100*h* wraps a periphery of the shielding frame 100*e*. Through the shielding frame 100*e* and the shielding cover 100*f*, the leakage of the radio frequency of the electronic component 100*b* could be blocked, so that the efficiency of the antenna module 100*c* could be prevented from being affected.

However, adding the shielding cover would increase a production cost. As a result, a cost effectiveness of the conventional shielding structure is not ideal for resolving the problem of reducing the leakage of the radio frequency.

Additionally, two antennas are also applied to the wireless equipment to receive and emit a wireless signal. A problem that the two adjacent antennas interfere each other could happen. Although an isolation between the two antennas could be improved by increasing an interval between the two antennas, such way to increase the interval still has limitations when the interval could not be increased due to limitations of space.

BRIEF SUMMARY OF THE INVENTION

In view of the above, the primary objective of the present disclosure is to provide an antenna module, which could be a shielding cover of an electronic component.

Another primary objective of the present disclosure is to provide an antenna module, which could enhance an isolation between two antennas.

The present disclosure provides an antenna module including two antennas, a reflecting board, and a plurality of extending plates, wherein the reflecting board has a first surface and a second surface opposite to the first surface; the first surface extends along a first axis and a second axis, wherein the first axis is perpendicular to the second axis; the two antennas are disposed on the first surface and are spaced along the first axis; a spacing zone is defined in the reflecting board, is located between the two antennas, and has a shielding portion; a periphery of the shielding portion has a plurality of open grooves; each of the open grooves penetrates through the first surface and the second surface; the shielding portion has a plurality of side edges, wherein each of the side edges is adjacent to each of the open grooves; the extending plates are respectively connected to the side edges; each of the extending plates extends towards the second surface; wherein the shielding portion and the extending plates jointly form a shielding cover.

With the aforementioned design, the extending plate of the antenna module and the shielding portion of the antenna module could be the shielding cover of the electronic component, and the open grooves could enhance the isolation between the two antennas.

The present disclosure further provides an antenna module including two antennas and a reflecting board, wherein the reflecting board has a first surface and a second surface opposite to the first surface; the first surface extends along a first axis and a second axis, wherein the first axis is perpendicular to the second axis; the two antennas are disposed on the first surface and are spaced along the first axis; a spacing zone is defined in the reflecting board and is located between the two antennas; the spacing zone of the reflecting board has at least one open groove, wherein the at least one open groove penetrates through the first surface and the second surface.

With the aforementioned design, the at least one open groove of the spacing zone could enhance the isolation between the two antennas.

BRIEF DESCRIPTION OF THE SEVERAL VIEWS OF THE DRAWINGS

The present disclosure will be best understood by referring to the following detailed description of some illustrative embodiments in conjunction with the accompanying drawings, in which.

DETAILED DESCRIPTION OF THE INVENTION

An antenna module 1 according to a first embodiment of the present disclosure includes two antennas 10, a reflecting board 20, and a plurality of extending plates 30 as shown in FIG. 2 to FIG. 5. To illustrate easily, a first axis X, a second axis Y, and a third axis Z being perpendicular to each other are defined.

Figure 1:
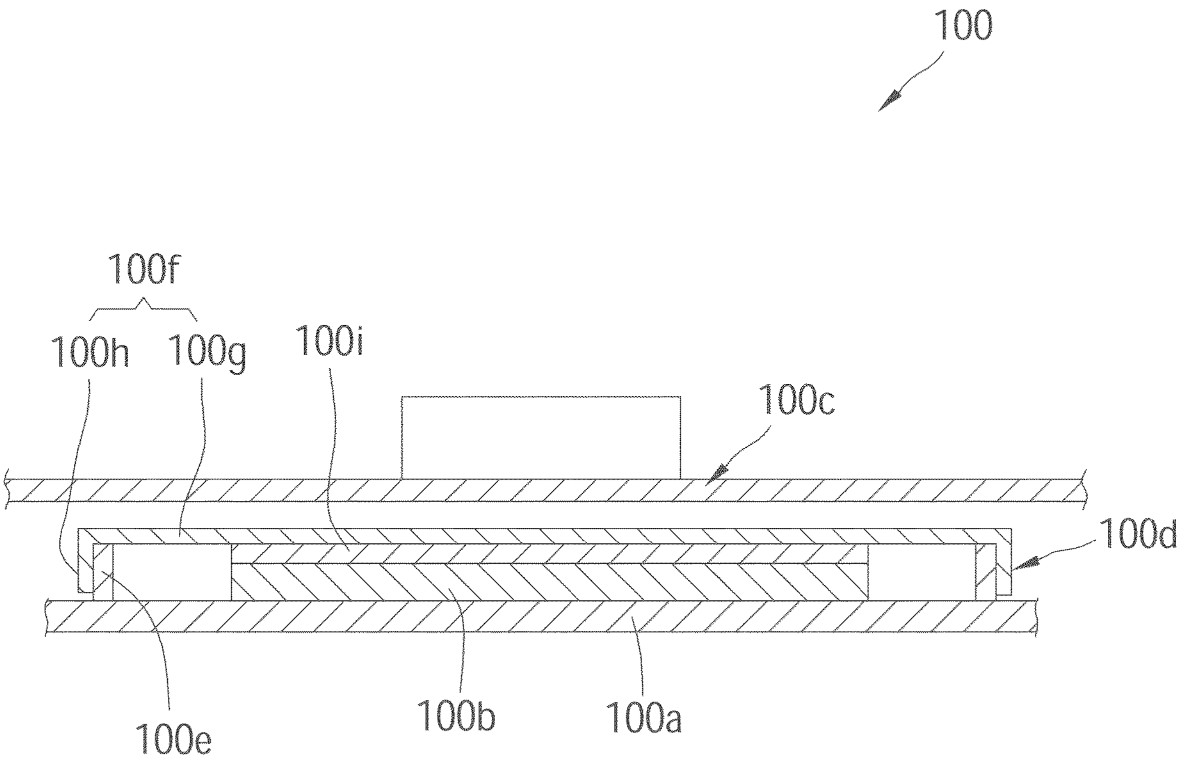
FIG. 1 (PRIOR ART)
FIG. 1 is a sectional schematic view of the conventional wireless equipment.
Figure 2:
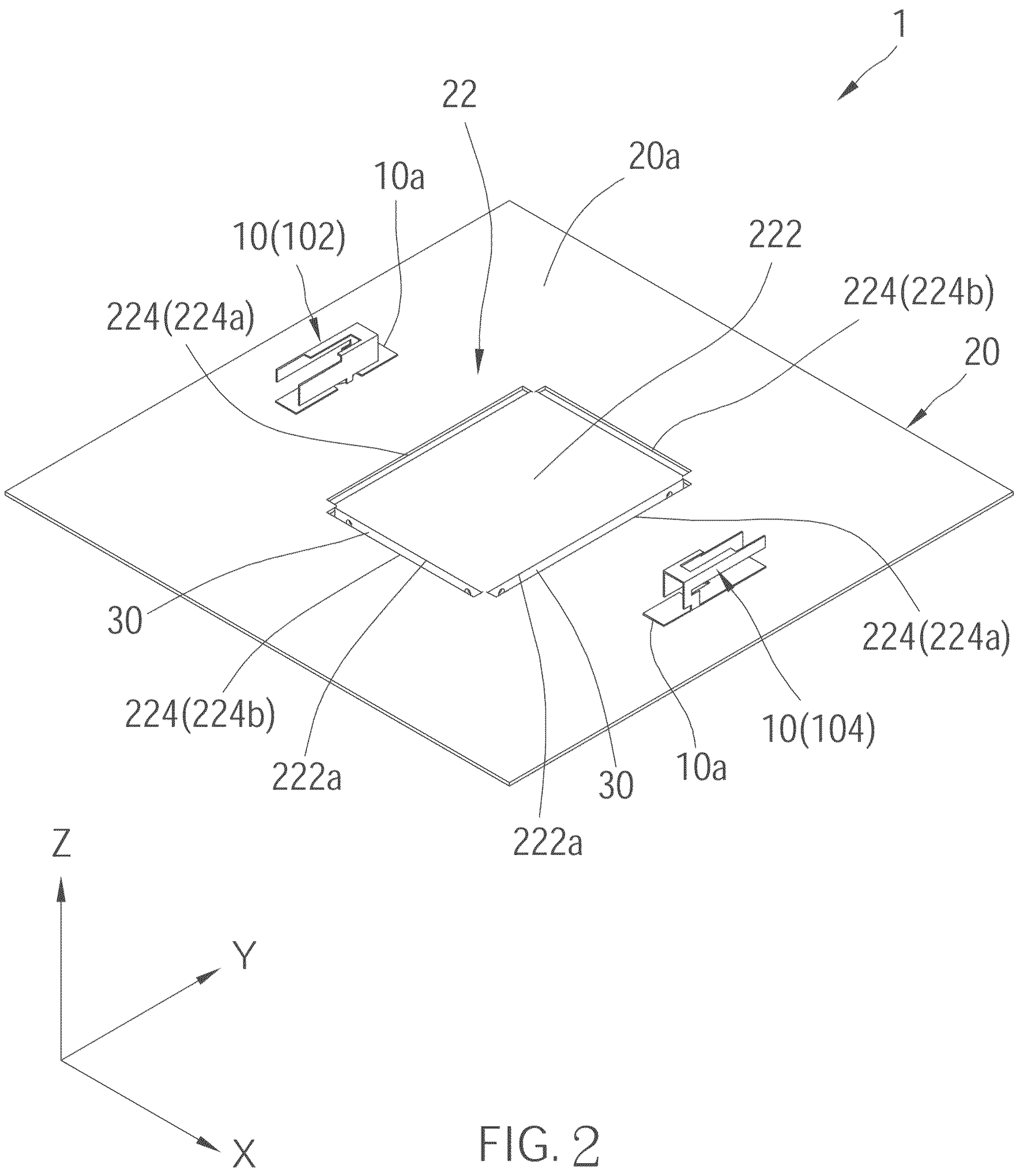
FIG. 2 is a perspective view of the antenna module according to a first embodiment of the present disclosure.
Figure 3:
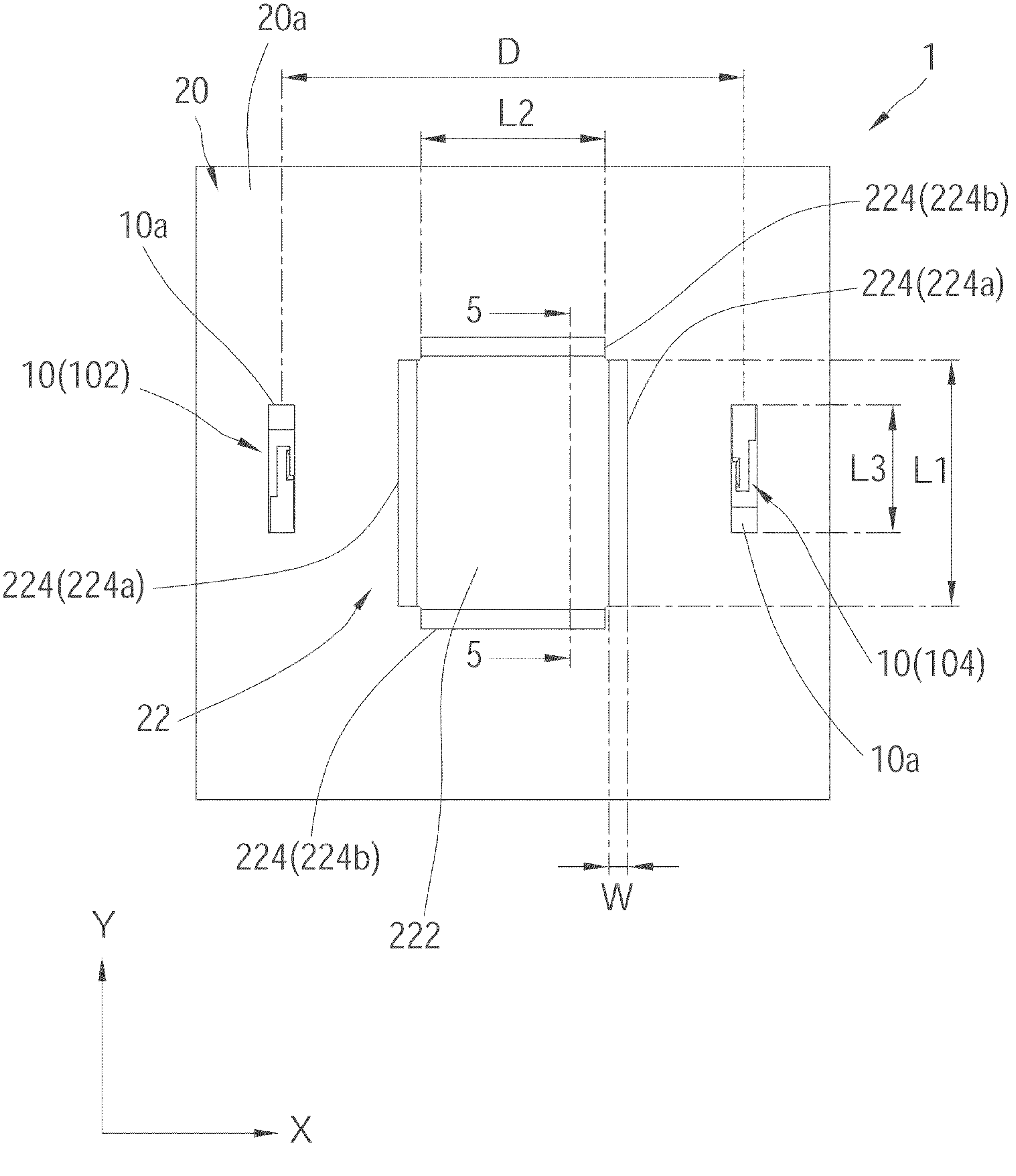
FIG. 3 is a top view of the antenna module according to the first embodiment of the present disclosure.
Figure 4:
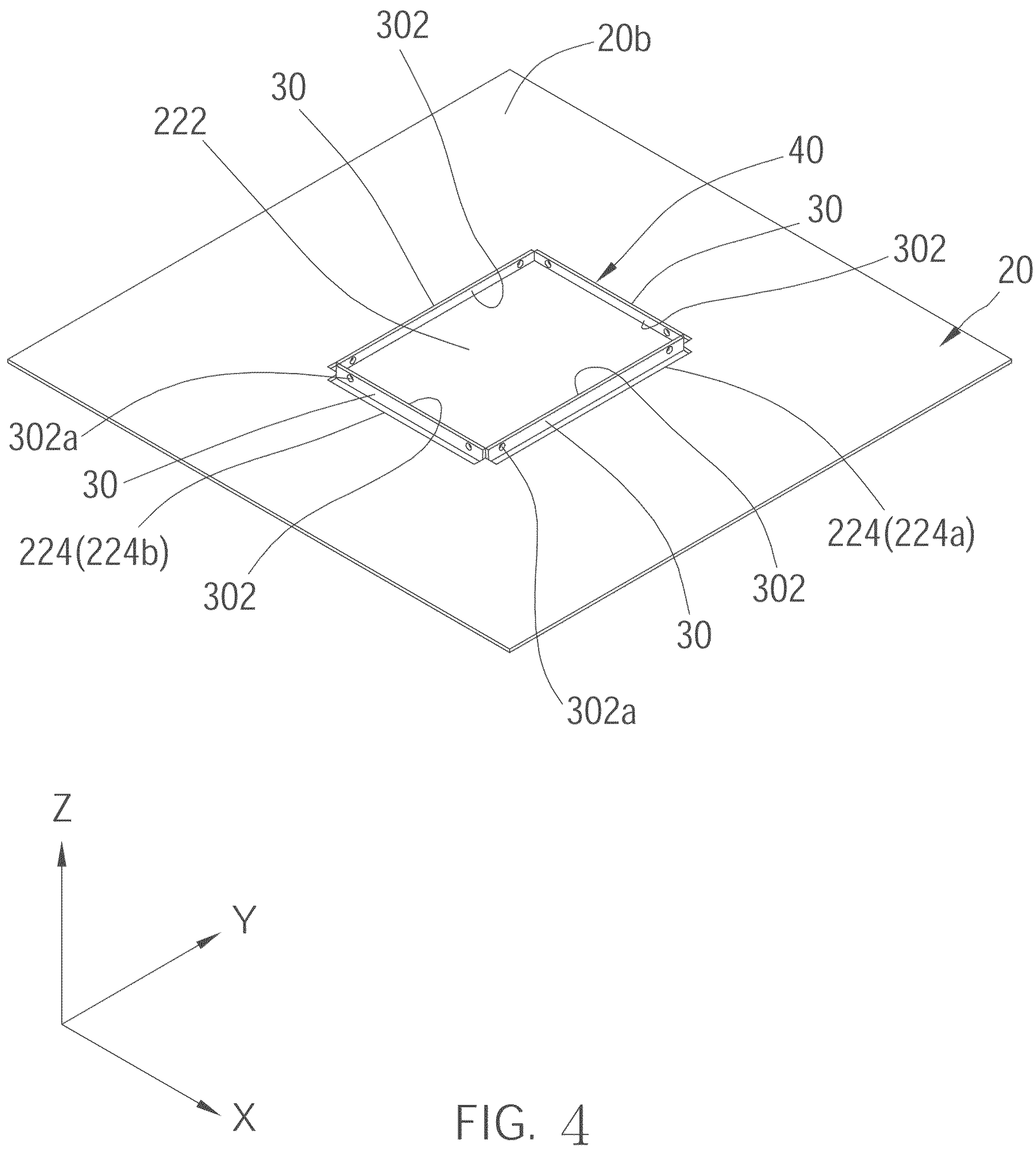
FIG. 4 is a perspective view of a bottom of the antenna module according to the first embodiment of the present disclosure.
Figure 5:
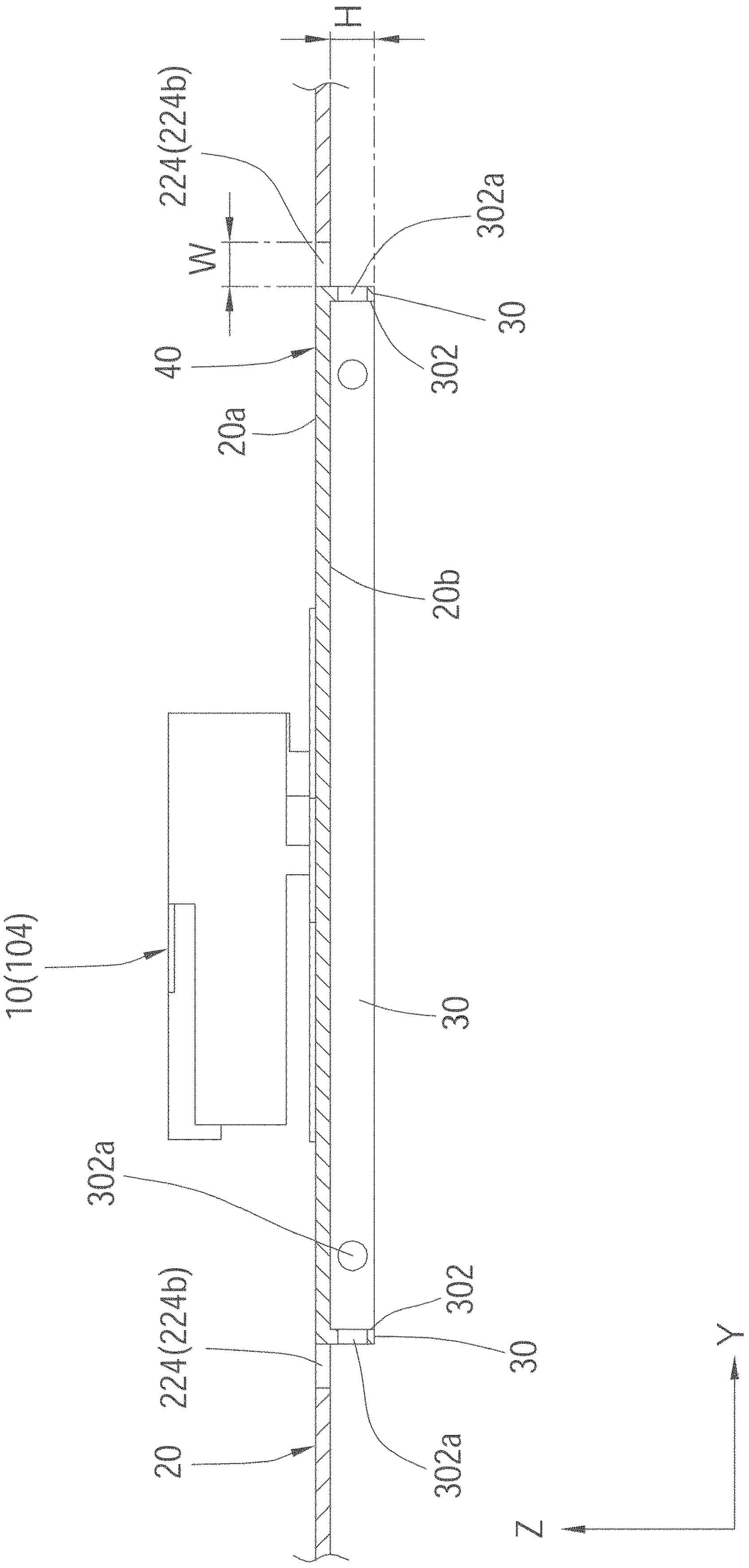
FIG. 5 is a sectional view along the 5-5 line in FIG. 3.

Each of the antennas 10 is a planar inverted-F antenna (PIFA) that is metallic, but not limited thereto; each of the antennas 10 could also be other kinds of antenna. The two antennas 10 are disposed on the reflecting board 20 and are spaced along the first axis X. Each of the antennas 10 is in a long shape and has a lateral direction and a longitudinal direction. The lateral direction of each of the antennas 10 extends along the first axis X. The longitudinal direction of each of the antennas 10 extends along the second axis Y. A difference between two orientations of the two antennas 10 is 180 degrees. In other words, the orientation of one of the two antennas 10 is opposite to the orientation of the other antenna 10. Each of the antennas 10 has a bottom plate 10*a* being combined with the reflecting board 20. As shown in FIG. 3, the antenna 10 being on the left side is defined as a first antenna 102 and the antenna 10 being on the right side is defined as a second antenna 104. A distance D between a center of the first antenna 102 in the lateral direction of the first antenna 102 and a center of the second antenna 104 in the lateral direction of the second antenna 104 along the first axis X is provided, wherein the distance D is between 80 mm and 135 mm. In the current embodiment, the distance D is 131.4 mm.

The reflecting board 20 is a metallic board as an example. The reflecting board 20 has a first surface 20*a* and a second surface 20*b* opposite to the first surface 20*a*, wherein the first surface 20*a* extends along the first axis X and the second axis Y and is parallel to the second surface 20*b*. The bottom plate 10*a* of each of the two antennas 10 is combined with the first surface 20*a*. The two antennas 10 are spaced along the first axis X.

In the current embodiment, the reflecting board 20 is in a rectangular shape, wherein two sides of the reflecting board 20 extend along the first axis X, and another two sides of the reflecting board 20 extend along the second axis Y. A spacing zone 22 is defined in the reflecting board 20 and is located between the two antennas 10. Through the spacing zone 22, the two antennas 10 are spaced. The spacing zone 22 has a shielding portion 222. A periphery of the shielding portion 222 has a plurality of open grooves 224, wherein each of the open grooves 224 penetrates through the first surface 20*a* and the second surface 20*b*. In other words, the spacing zone 22 has the plurality of open grooves 224, and the shielding portion 222 has a plurality of side edges 222*a*, wherein each of the side edges 222*a* is adjacent to each of the open grooves 224. In other words, in the spacing zone 22, a portion surrounded by the open grooves 224 is the shielding portion 222. In the current embodiment, the shielding portion 222 is in a rectangular shape. To achieve the purpose of enhancing an isolation between the two antennas 10, a number of the open groove 224 of the spacing zone 22 could be at least one. How to enhance the isolation will be described afterwards.

The extending plates 30 are respectively connected to the side edges 222*a* of the shielding portion 222. Each of the extending plates 30 extends towards the second surface 20*b* along the third axis Z. The shielding portion 222 and the extending plates 30 jointly form a shielding cover 40 of the reflecting board 20. In the current embodiment, each of the extending plates 30 is integrated with each of the side edges 222*a*. More specifically, when the extending plates 30 are produced, three trenches communicating with each other are first cut on the metallic board in a location being reserved for the open grooves 224 in the spacing zone 22, wherein the three trenches could be cut by laser cutting as an example. A board body surrounded by the three trenches becomes the extending plate 30. Then, the extending plates 30 are bent towards the second surface 20*b*, so that the extending plates 30 which extend along the third axis Z could be formed, and the open grooves 224 are formed in a location in which the extending plates 30 exist before the extending plates 30 are bent.

Each of the open grooves 224 is in a long shape and has a longitudinal direction and a lateral direction. Each of the open grooves 224 is closed along the first axis X and the second axis Y. In the current embodiment, the number of the open groove 224 is four, but not limited thereto. The number of the open groove 224 could be five or more, as long as the open grooves 224 could surround the periphery of the shielding portion 222. The open grooves 224 include two first open grooves 224*a* and two second open grooves 224*b*. The two first open grooves 224*a* are spaced along the first axis X. The longitudinal direction of each of the first open grooves 224*a* extends along second axis Y and is parallel to the longitudinal direction of each of the two antennas 10. Two ends of each of the two antennas 10 in the longitudinal direction of each of the two antennas 10 are located between two ends of each of the first open grooves 224*a* in the longitudinal direction of each of the first open grooves 224*a*. The two second open grooves 224*b* are spaced along the second axis Y. The longitudinal direction of each of the second open grooves 224*b* extends along the first axis X. Two ends of each of the first open grooves 224*a* are respectively adjacent to two ends of each of the second open grooves 224*b*.

A length of each of the first open grooves 224*a* along the longitudinal direction of each of the first open grooves 224*a* is defined as a first length L1, wherein the first length L1 is between 37 mm and 73 mm. A length of each of the second open grooves 224*b* along the longitudinal direction of each of the second open grooves 224*b* is defined as a second length L2, wherein the second length L2 is between 27 mm and 55 mm. Preferably, the second length L2 is less than the first length L1; the second length L2 is three quarters times than the first length L1. As shown in FIG. 3, the first length L1 is 70 mm; the second length L2 is 52.5 mm. A distance between the two first open grooves 224*a* along the first axis X is equal to a length of each of the second open grooves 224*b* along the first axis X (i.e., the second length L2).

The length of each of the first open grooves 224*a* along the longitudinal direction of each of the first open grooves 224*a* is not less than a length of each of the antennas 10 along the longitudinal direction of each of the antennas 10. In other words, a length of the bottom plate 10*a* of each of the antennas 10 along the second axis Y is defined as a third length L3, wherein the first length L1 is not less than the third length L3. In the current embodiment, the third length L3 is 36.3 mm as an example. At least one part of each of the antennas 10 overlaps with each of the first open grooves 224*a* along the first axis X. In other words, the at least one part of each of the antennas 10 is located within a projection range of each of the first open grooves 224*a* along the first axis X.

Each of the open grooves 224 has a width W along the lateral direction of each of the open grooves 224, wherein the width W is about 2.3 mm to 3.3 mm. In the current embodiment, the width W is 3 mm as an example. Each of the extending plates 30 has a height H along the third axis Z, wherein the height H is calculated from the second surface 20*b* and is not greater than the width W. In the current embodiment, the height H is between 2.3 mm and 3.3 mm.

Selectively, two of the extending plates 30 which face each other respectively have an inner surface 302, wherein the inner surfaces 302 of the two extending plates face each other. At least one positioning hole 302*a* is disposed on each of the inner surfaces 302. In the current embodiment, the number of the at least one positioning hole 302*a* of the inner surface 302 of each of the extending plates 30 is two, but not limited thereto. The number of the at least one positioning hole 302*a* could be one, three, or more.

Figure 6:
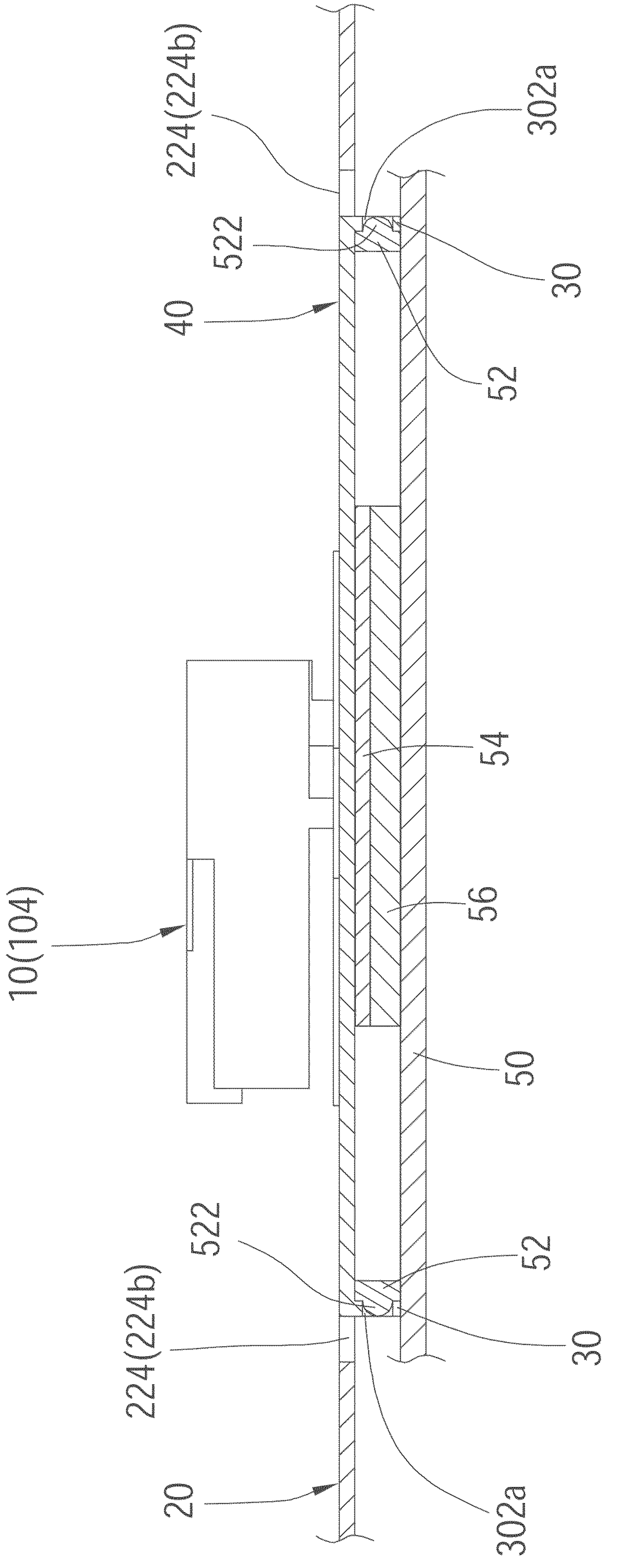
FIG. 6 is a schematic view showing the shielding cover of the antenna module covering the shielding frame according to the first embodiment of the present disclosure.

Referring to FIG. 6, in the current embodiment, the antenna module 1 could cover a shielding frame 52 of a circuit board 50 by the shielding cover 40. Preferably, the shielding frame 52 has two positioning convex portions 522 corresponding to each of the positioning holes 302*a*, wherein the positioning convex portions 522 could protrude into the positioning holes 302*a*, so that the extending plate 30 could be engaged with the shielding frame 52. A thermal pad 54 abuts between the second surface 20*b* of the shielding portion 222 and the electronic component 56, so that the electronic component 56 could be cooled through the shielding portion 222. In this way, the antenna module 1 of the embodiment could not only shield the leakage of radio frequency of the electronic component but could be a thermal plate.

Although four extending plates 30 are provided in the current embodiment as an example, a number of the extending plate 30 could be at least two, wherein the two extending plates 30 face each other. In this way, the two extending plates 30 which face each other could be combined with two opposite sides of the shielding frame 52.

Figure 7:
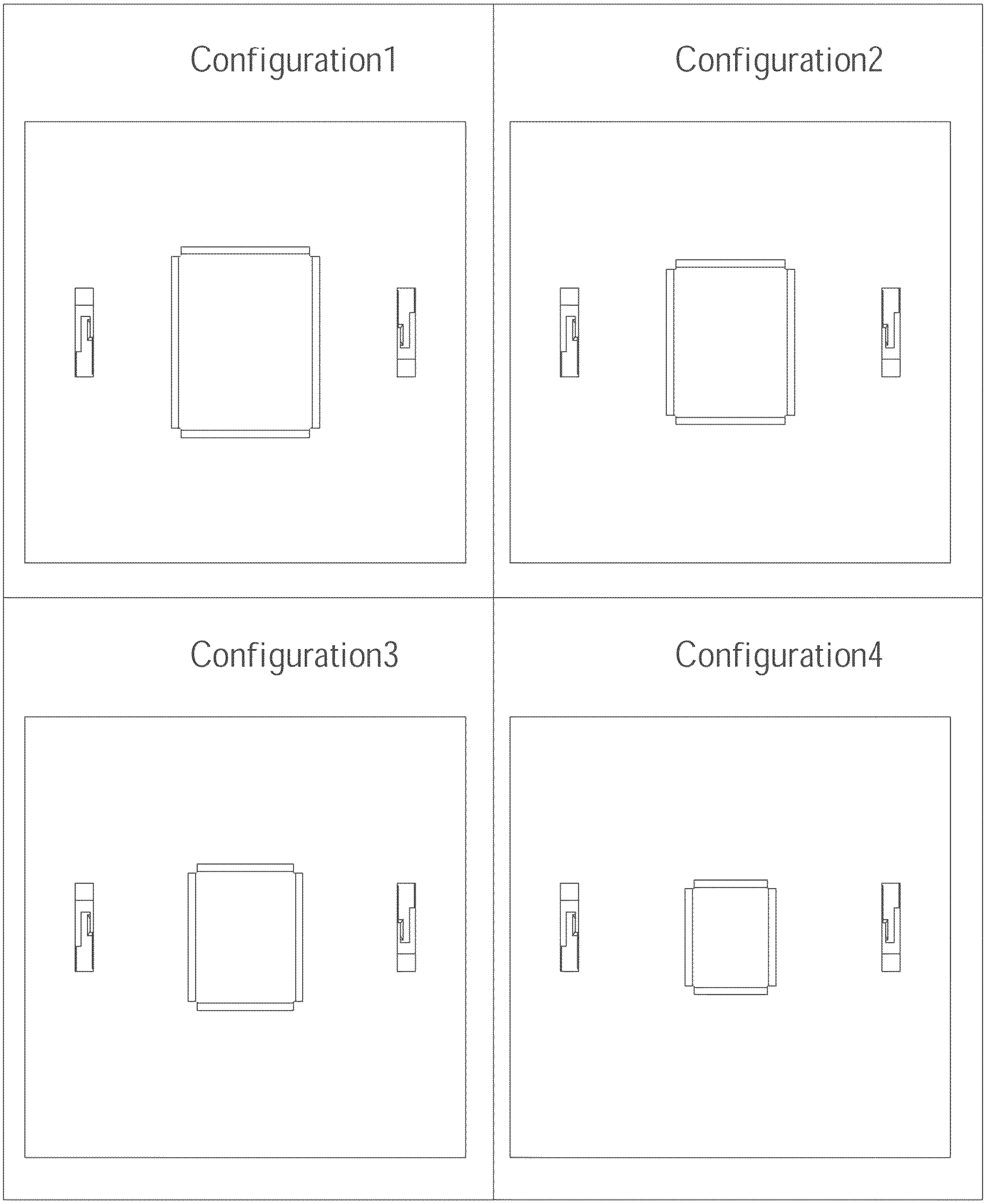
FIG. 7 is a schematic view showing the configuration 1 to the configuration 4 of the antenna module according to the first embodiment of the present disclosure.

Different configurations 1 to 4 of the antenna module 1 of the current embodiment are illustrated in FIG. 7. The configuration 1 is a structure as shown in FIG. 3. In the configuration 2 to the configuration 4, the first length L1 of the two first open grooves 224*a* are different and the second length L2 of the two second open grooves 224*b* are different as shown in Table 1. In the configuration 1 to the configuration 4, the width W of each of the open grooves 224 along the lateral direction of each of the open grooves 224 is 3 mm. The first length L1 or the second length L2 of the configuration 1 to the configuration 3 are respectively 1.75, 1.5, and 1.25 times the first length L1 or the second length L2 of the configuration 4.

TABLE 1 the first lengths and the second lengths of the configuration 1 to the configuration 4

| | Configuration 1 | Configuration 2 | Configuration 3 | Configuration 4 |
|---|---|---|---|---|
| First length | 70 mm | 60 mm | 50 mm | 40 mm |
| Second length | 52.5 mm | 45 mm | 37.5 mm | 30 mm |

Figure 8:
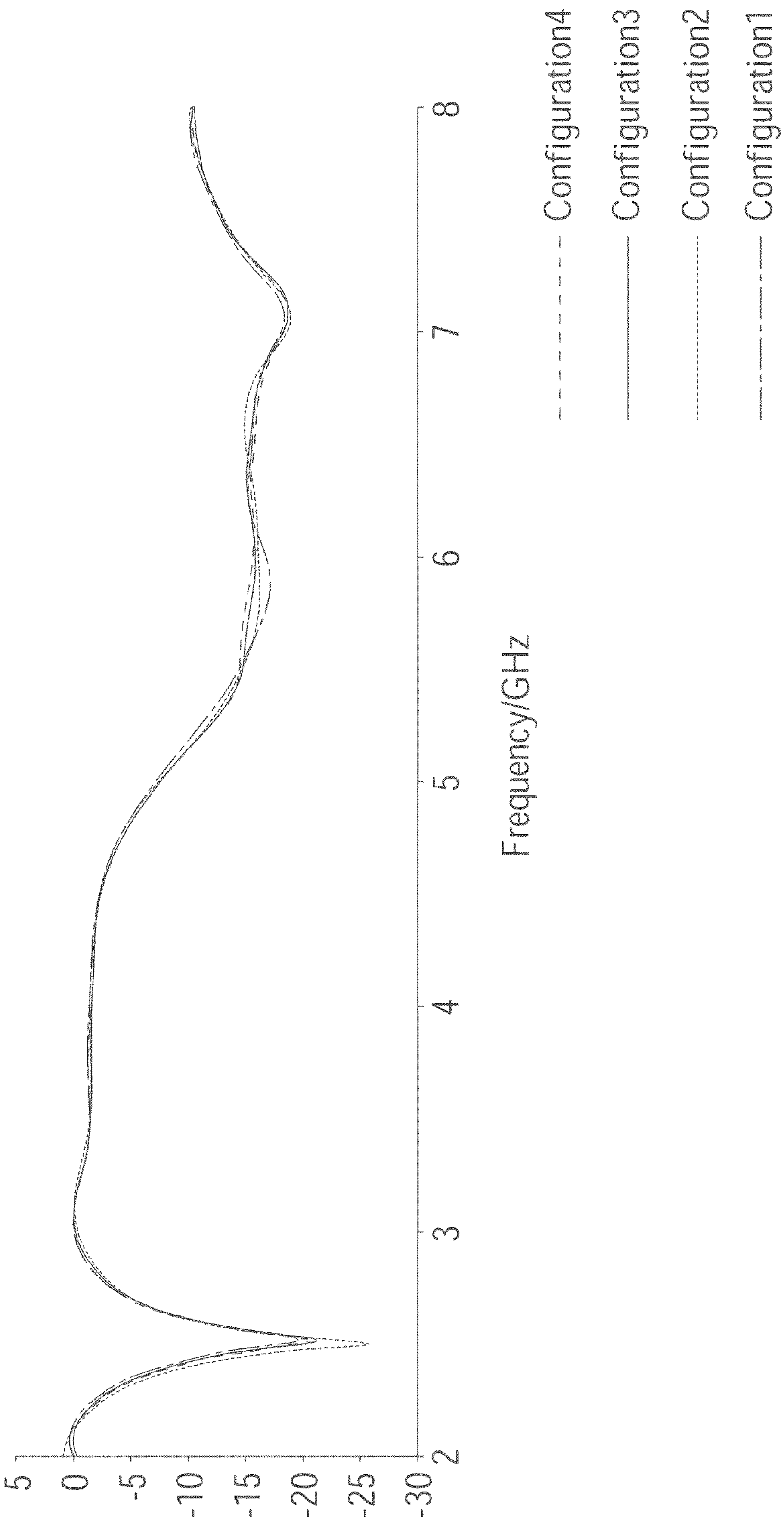
FIG. 8 is a schematic view showing S1,1 of the configuration 1 to configuration 4 in FIG. 7.
Figure 9:
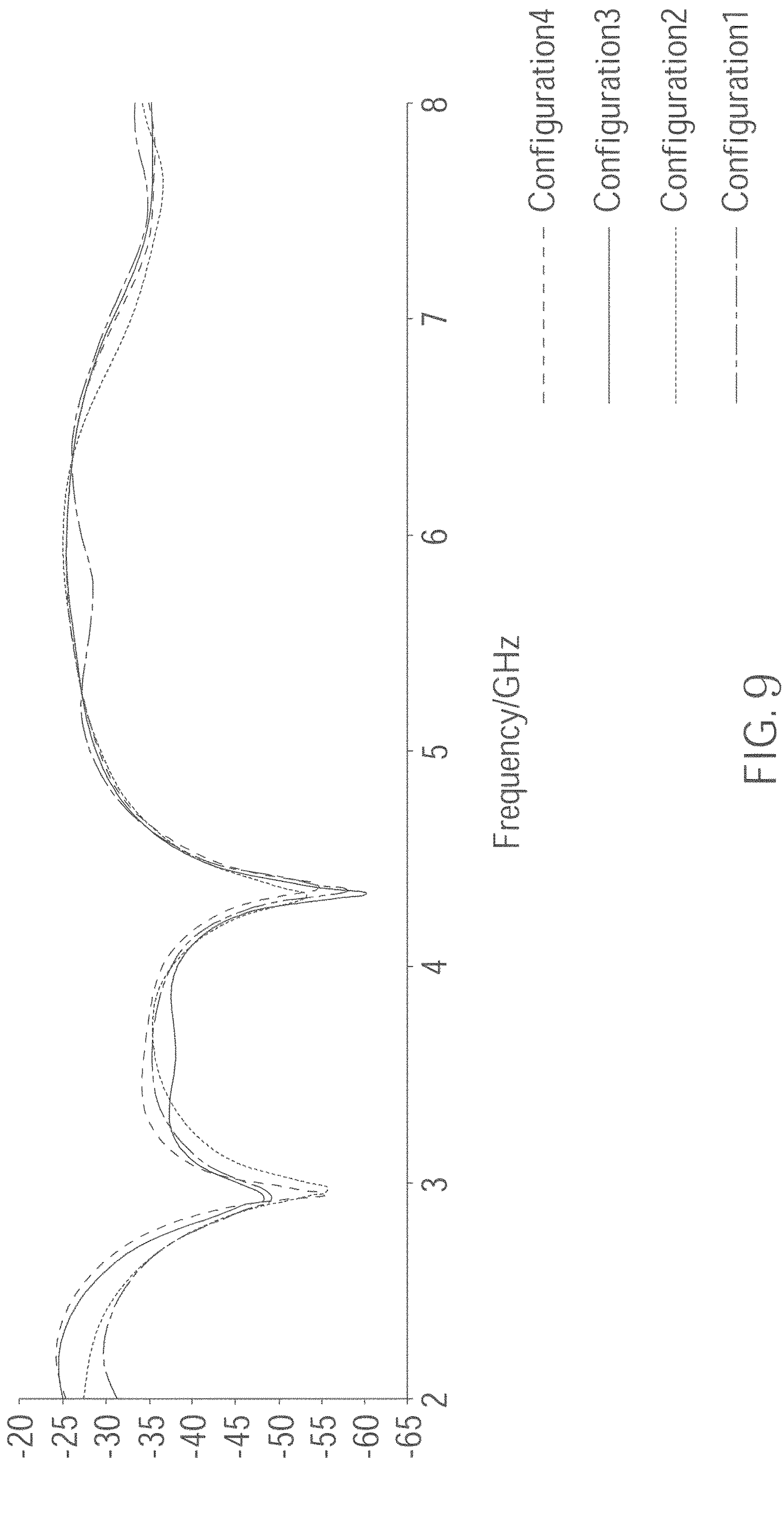
FIG. 9 is a schematic view showing S2,1 of the configuration 1 to configuration 4 in FIG. 7.

FIG. 8 is a schematic view showing S1,1, i.e., a return loss, of the configuration 1 to the configuration 4 of the first embodiment, wherein S1,1 corresponds to the first antenna 102. FIG. 9 is a schematic view showing S2,1 of the configuration 1 to the configuration 4 of the first embodiment, wherein S2,1 is the isolation between the first antenna 102 and the second antenna 104. As shown in Table 2, the isolation could be enhanced along with the increase in the first length L1 and the second length L2.

TABLE 2

| the isolations of the configuration 1 to the configuration 4 and a comparative example | Configuration 1 | Configuration 2 | Configuration 3 | Configuration 4 | Comparative example |
|---|---|---|---|---|---|
| 2.45 GHz - isolation (dB) | −31.178 | −30.779 | −26.847 | −26.067 | −25.599 |
| 5.5 GHz - isolation (dB) | −27.848 | −26.231 | −26.383 | −26.253 | −23.236 |

Figure 10:
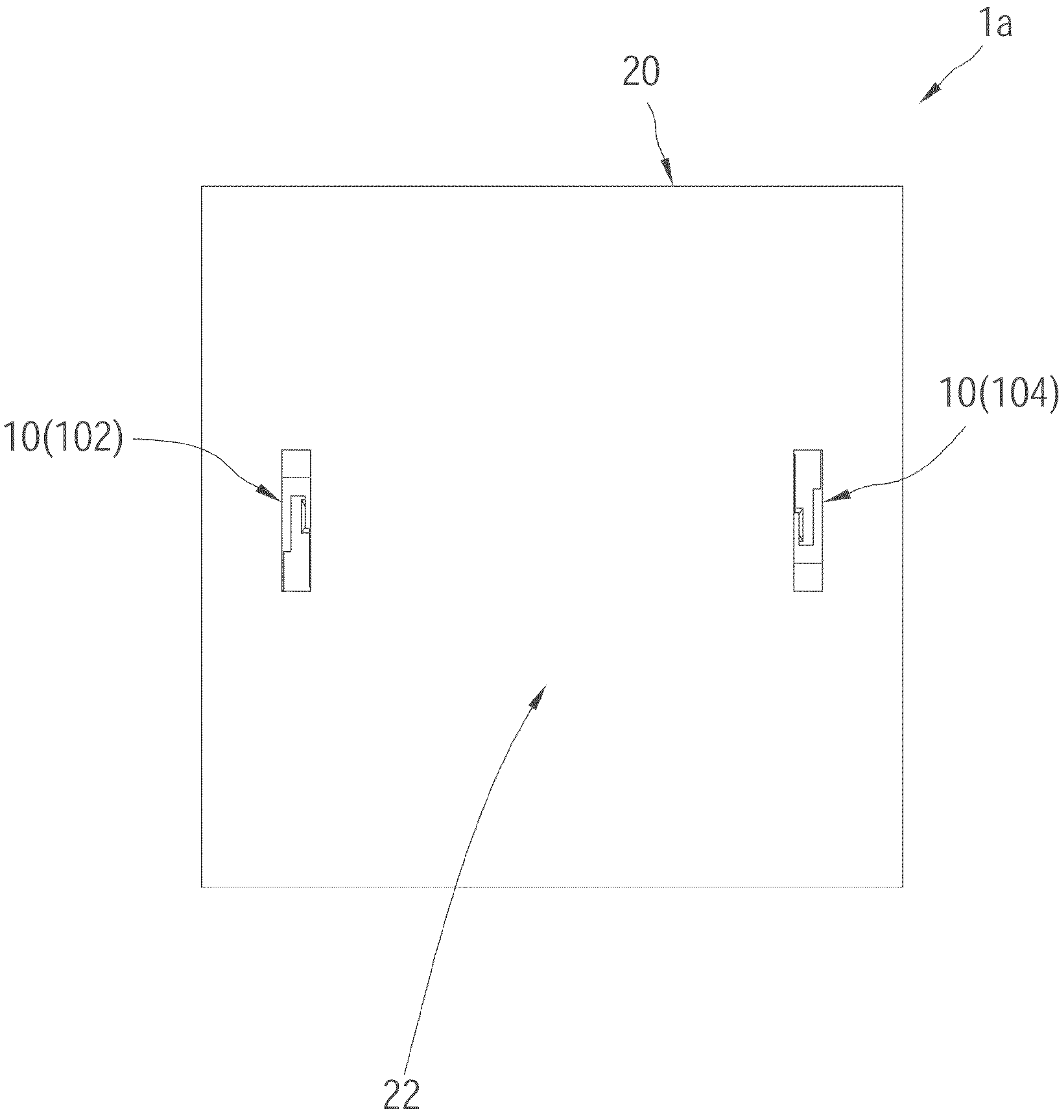
FIG. 10 is a schematic view of the antenna module according to a comparative example of the present disclosure.
Figure 11:
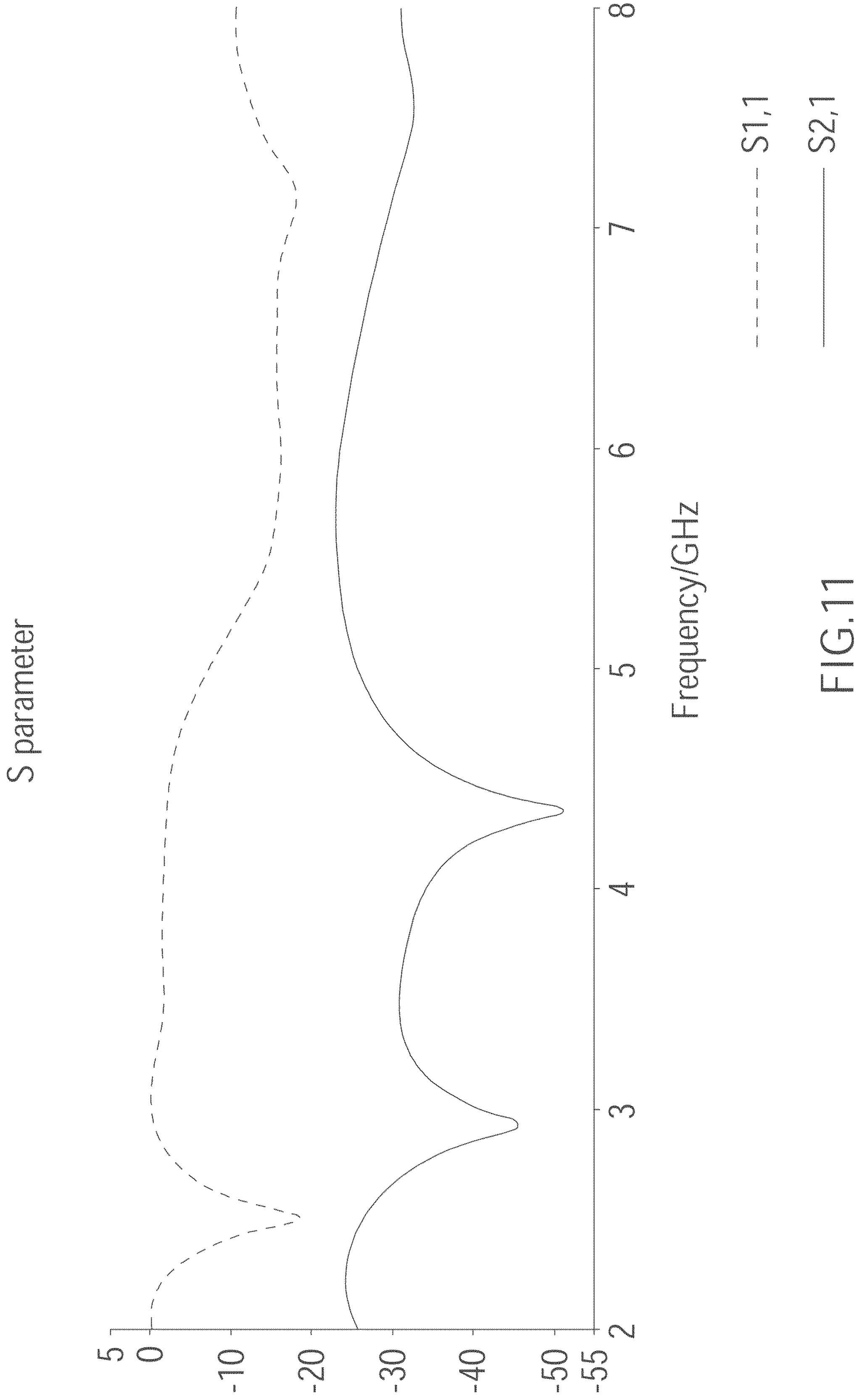
FIG. 11 is a schematic view showing S1,1 and S2,1 of the comparative example in FIG. 10.

To compare the effect of the open grooves 224 on the isolation, an antenna module 1*a* of a comparative example, of which the spacing zone 22 is provided without the open grooves 224, is illustrated in FIG. 10. FIG. 11 is a schematic view showing S1,1 and S2,1 of the antenna module 1*a* of the comparative example. The isolation at 2.45 GHz and the isolation at 5.5 GHz of the comparative example are also listed in Table 2 for comparison. Referring to Table 2, it could be obviously seen that the isolation of the configuration 1 to the configuration 4 are much enhanced comparing with the comparative example that is provided without the open groove.

When one open groove 224 is adopted to enhance the isolation, the longitudinal direction of the open groove 224 extends along the first axis X or extends along the second axis Y. When two open grooves 224 are adopted to enhance the isolation, the two longitudinal directions of the two open grooves 224 (i.e., the two first open grooves 224*a* or the two second open grooves 224*b*) are parallel.

Figure 12:
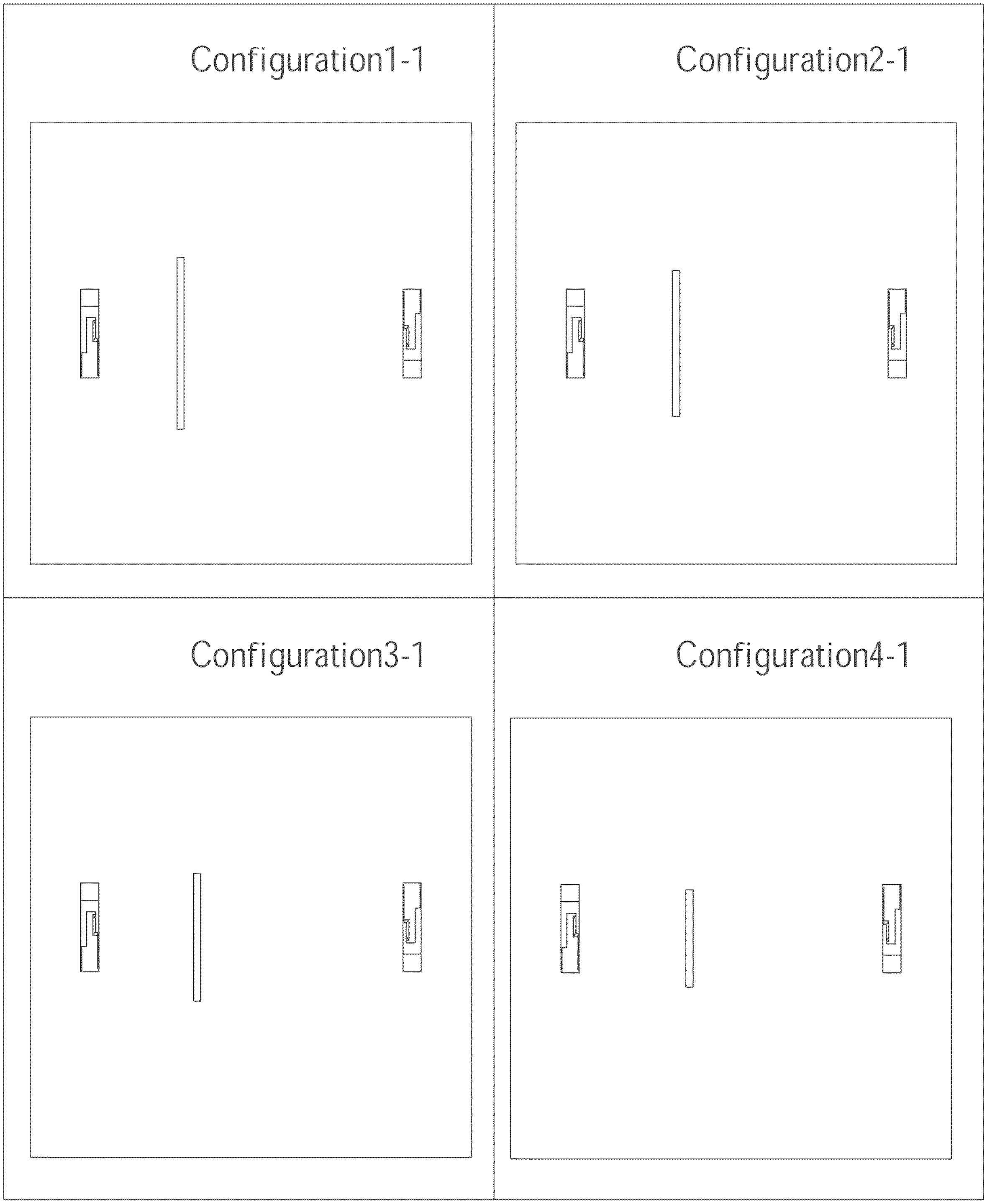
FIG. 12 is a schematic view showing the configuration 1-1 to the configuration 4-1 of the antenna module according to the first embodiment of the present disclosure.
Figure 13:
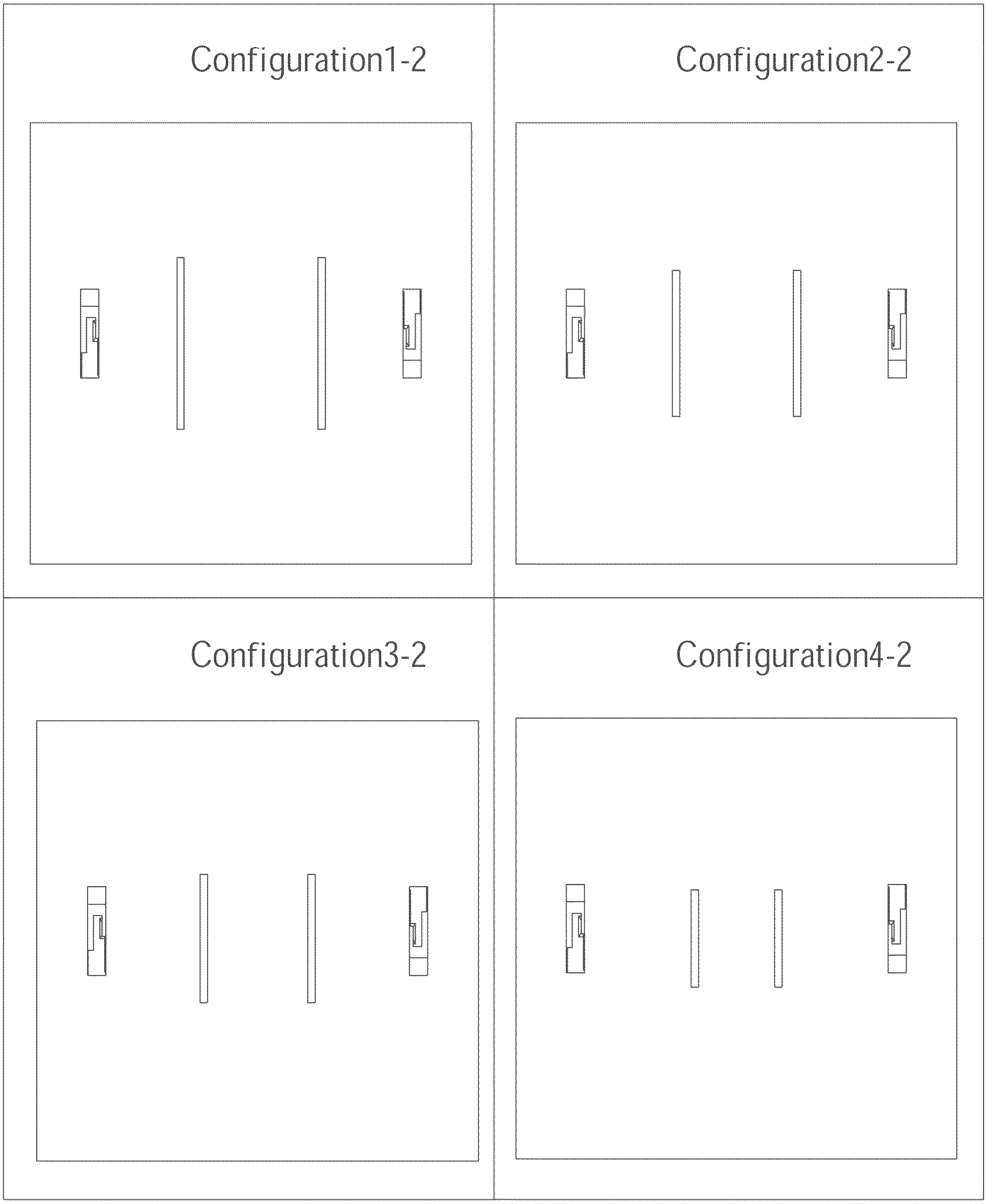
FIG. 13 is a schematic view showing the configuration 1-2 to the configuration 4-2 of the antenna module according to the first embodiment of the present disclosure.
Figure 14:
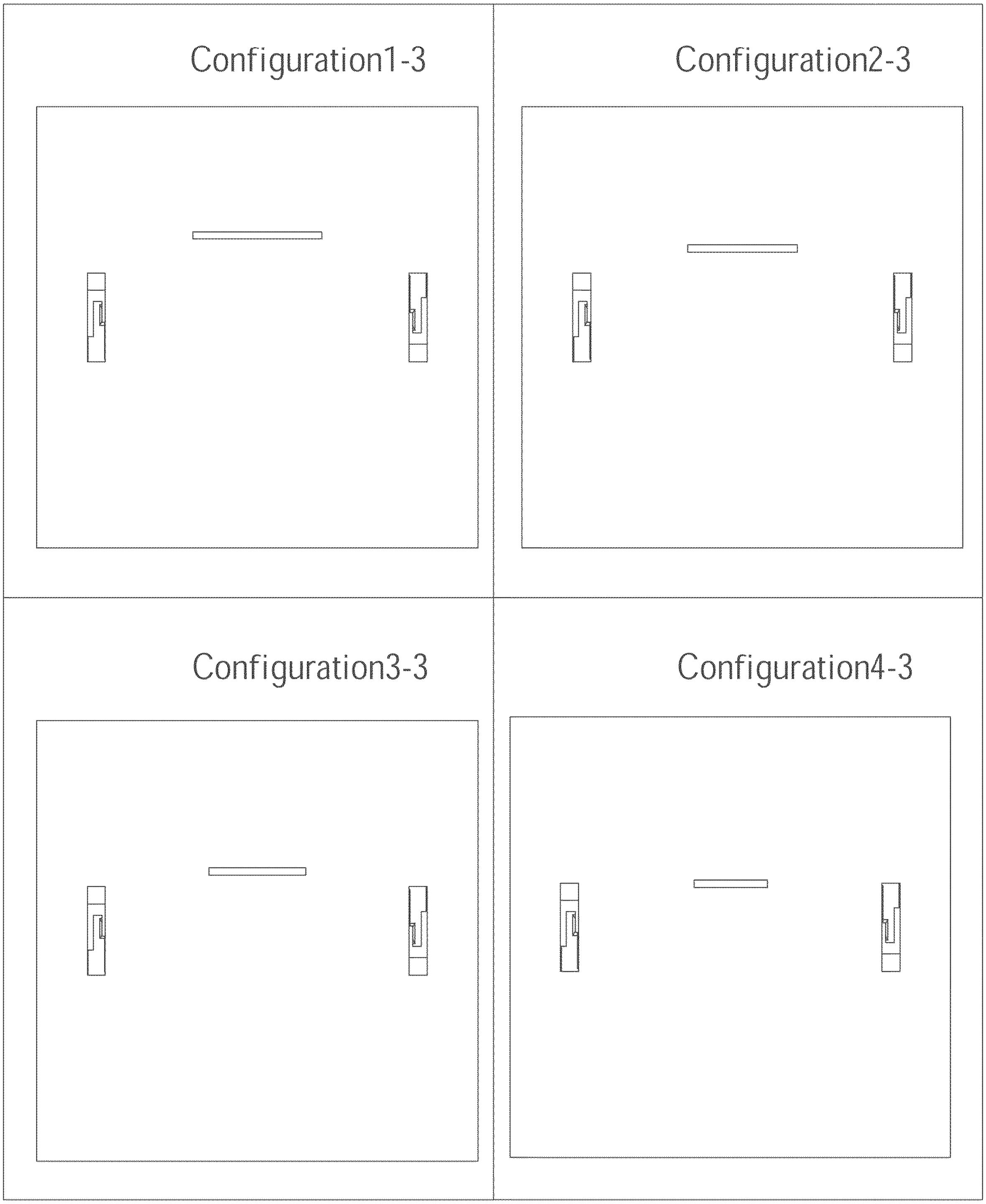
FIG. 14 is a schematic view showing the configuration 1-3 to the configuration 4-3 of the antenna module according to the first embodiment of the present disclosure.
Figure 15:
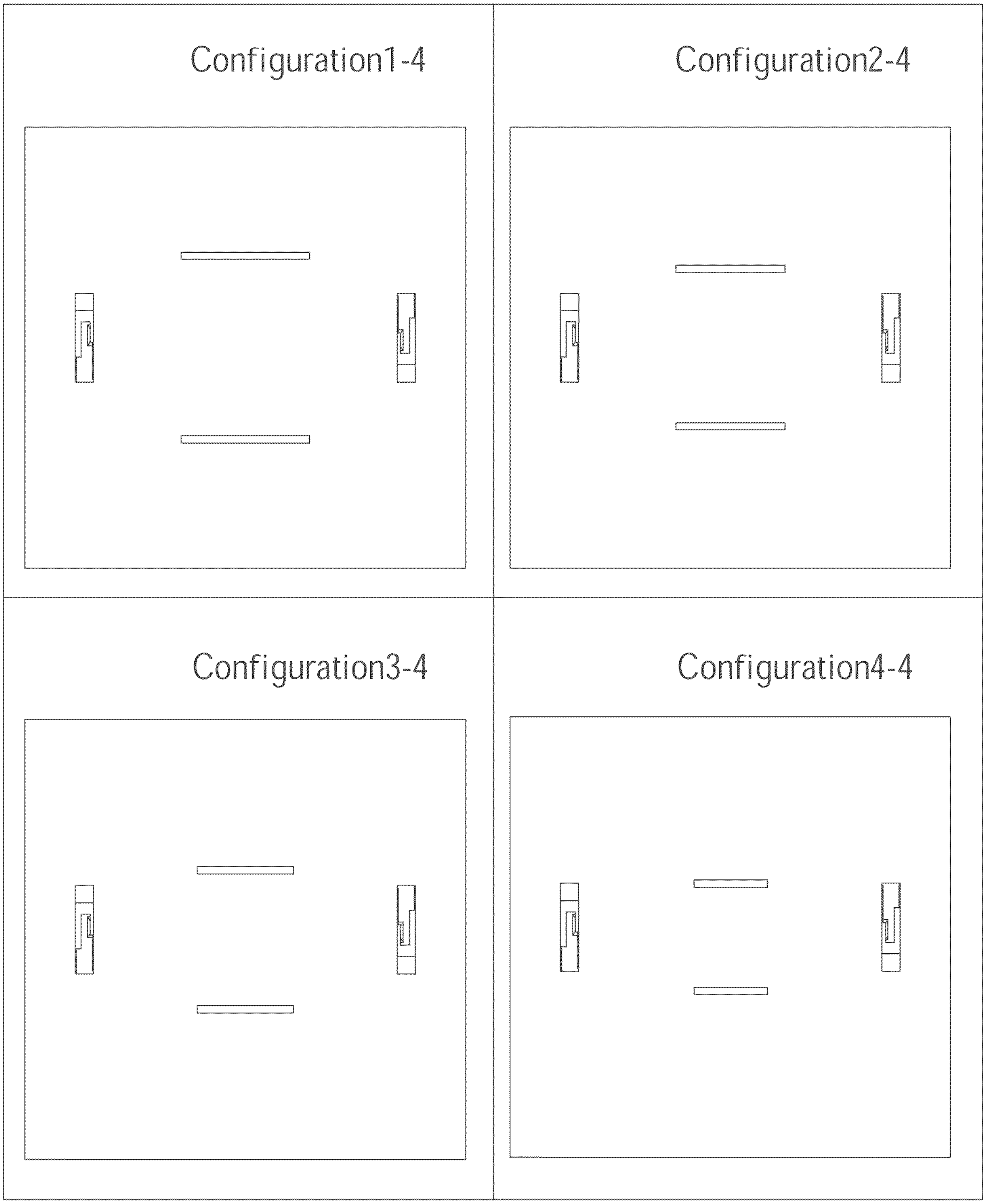
FIG. 15 is a schematic view showing the configuration 1-4 to the configuration 4-4 of the antenna module according to the first embodiment of the present disclosure.

To compare the effect of the number of the open grooves 224 on the isolation, a plurality of configurations 1-1 to 4-4 with different numbers of the open grooves 224 and corresponding to the configuration 1 to the configuration 4 of the first embodiment are provided as shown in FIG. 12 to FIG. 15. The first length L1 and the second length L2 of each of the configurations 1-1 to 4-4 are provided as shown in Table 1. As shown in FIG. 12, the configuration 1-1 to the configuration 4-1 are provided with one first open groove 224*a*. As shown in FIG. 13, the configuration 1-2 to the configuration 4-2 are provided with two first open grooves 224*a*. As shown in FIG. 14, the configuration 1-3 to the configuration 4-3 are provided with one second open groove 224*b*. As shown in FIG. 15, the configuration 1-4 to the configuration 4-4 are provided with two second open grooves 224*b*. The isolations of the configurations 1-1 to 4-4 in FIG. 12 to FIG. 15 are listed in Table 3.

TABLE 3 the isolations of the configuration 1-1 to the configuration 4-4 and the comparative example

| | Configuration 1-1 | Configuration 2-1 | Configuration 3-1 | Configuration 4-1 | Comparative example |
|---|---|---|---|---|---|
| 2.45 GHz - isolation (dB) | −30.485 | −29.552 | −26.498 | −26.428 | −25.599 |
| 5.5 GHz - isolation (dB) | −25.957 | −25.55 | −25.377 | −25.255 | −23.236 |
| | Configuration 1-2 | Configuration 2-2 | Configuration 3-2 | Configuration 4-2 | Comparative example |
| 2.45 GHz - isolation (dB) | −31.81 | −30.953 | −26.433 | −26.211 | −25.599 |
| 5.5 GHz - isolation (dB) | −27.878 | −26.888 | −26.556 | −26.186 | −23.236 |
| | Configuration 1-3 | Configuration 2-3 | Configuration 3-3 | Configuration 4-3 | Comparative example |
| 2.45 GHz - isolation (dB) | −27.519 | −28.103 | −26.931 | −26.903 | −25.599 |
| 5.5 GHz - isolation (dB) | −23.441 | −23.351 | −23.973 | −24.06 | −23.236 |
| | Configuration 1-4 | Configuration 2-4 | Configuration 3-4 | Configuration 4-4 | Comparative example |
| 2.45 GHz - isolation (dB) | −27.515 | −28.101 | −26.929 | −26.901 | −25.599 |
| 5.5 GHz - isolation (dB) | −23.437 | −23.35 | −23.971 | −24.058 | −23.236 |

It could be seen from Table 3 that one open groove 224 (i.e., the configuration 1-1 to the configuration 4-1 or the configuration 1-3 to the configuration 4-3) could enhance the isolation, especially the isolation at 2.45 GHz. The isolation effect of one first open groove 224*a* (i.e., the configuration 1-1 to the configuration 4-1) is better than the isolation effect of one second open groove 224*b* (i.e., the configuration 1-3 to the configuration 4-3). Two first open grooves 224*a* (i.e., the configuration 1-2 to the configuration 4-2) or two second open grooves 224*b* (i.e., the configuration 1-4 to the configuration 4-4) could also enhance the isolation, wherein the isolation effect of two first open grooves 224*a* (i.e., the configuration 1-2 to the configuration 4-2) is similar to the isolation effect of four open grooves 224 (i.e., the configuration 1 to the configuration 4). When the longitudinal directions of the open grooves 224 and the longitudinal directions of the antennas 10 are parallel, the isolation effect is better.

Figure 16:
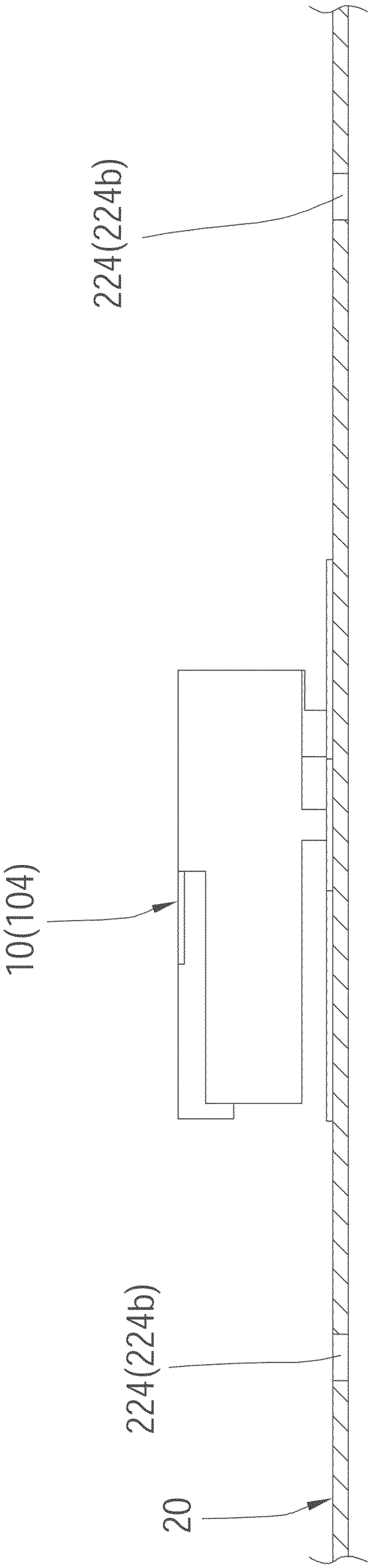
FIG. 16 is a schematic view showing the antenna module without the extending plate according to the first embodiment of the present disclosure.

Due to the extending plates 30 extending towards the second surface 20*b* and being adapted to be connected to the shielding frame 52, the extending plates 30 would not affect a receiving or an emission of the antennas 10. Therefore, when the antenna module 1 does not serve as a shielding cover for shielding, the extending plates 30 could be removed as shown in FIG. 16. In other words, one or a plurality of open grooves 224 could be disposed in the spacing zone 22 to enhance the isolation between the two antennas 10.

Figure 17:
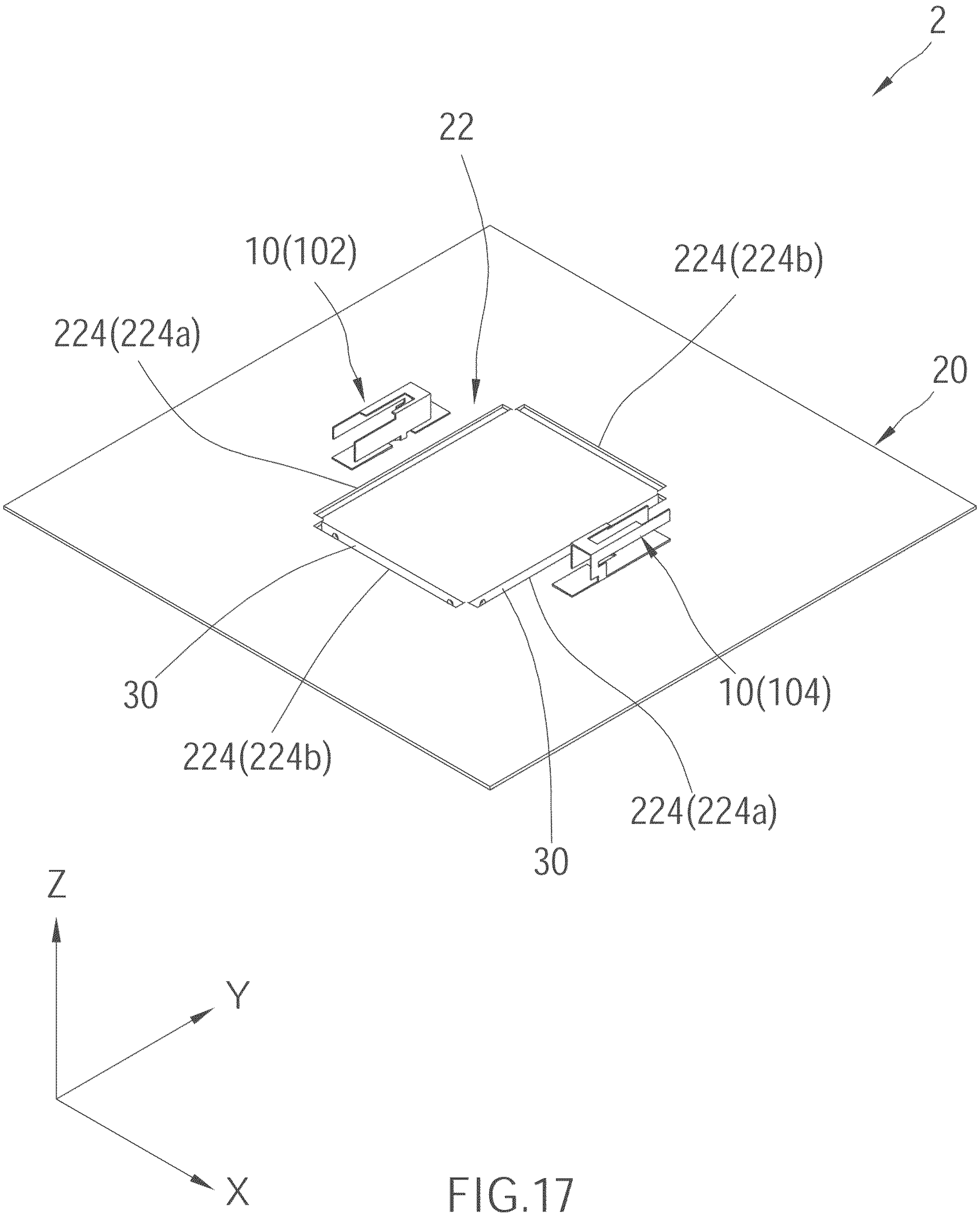
FIG. 17 is a perspective view of the antenna module according to a second embodiment of the present disclosure.
Figure 18:
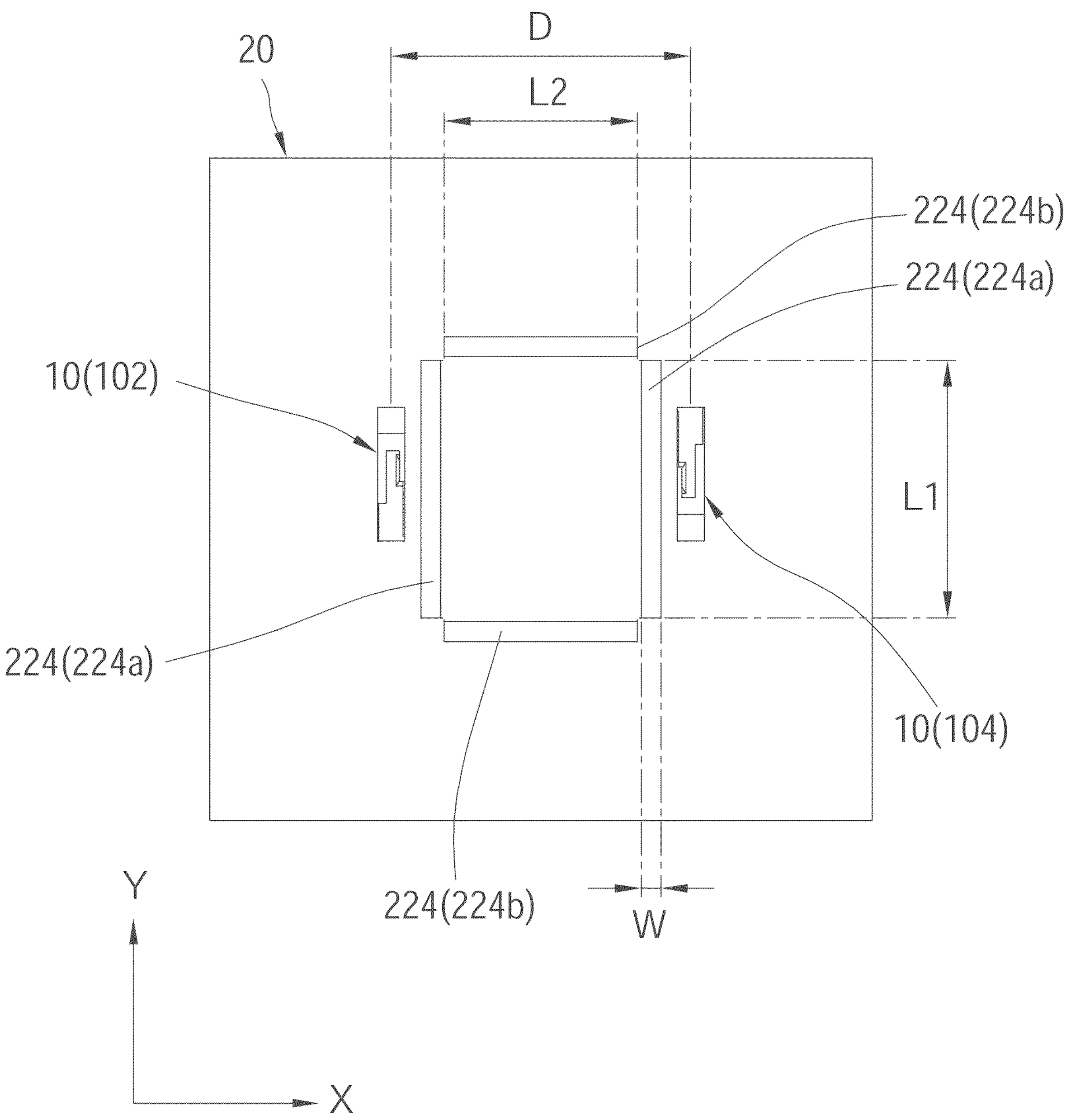
FIG. 18 is a top view of the antenna module according to the second embodiment of the present disclosure.

An antenna module 2 according to a second embodiment of the present disclosure is illustrated in FIG. 17 and FIG. 18 and has almost the same structure as the structure of the first embodiment except that the distance D of the second embodiment between the center of the first antenna 102 in the lateral direction of the first antenna 102 and the center of the second antenna 104 in the lateral direction of the second antenna 104 along the first axis X is 81.4 mm.

Figure 19:
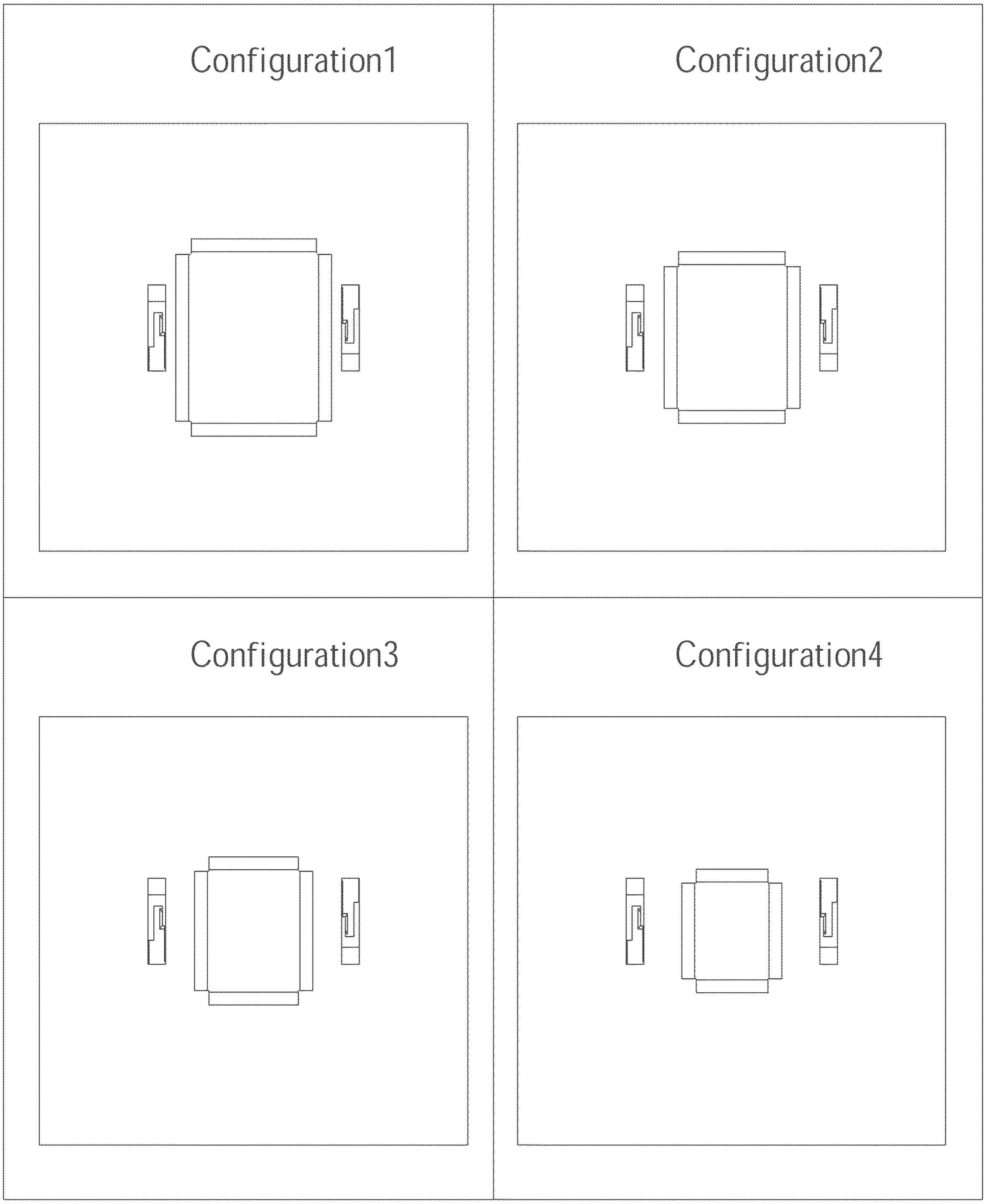
FIG. 19 is a schematic view showing the configuration 1 to the configuration 4 of the antenna module according to the second embodiment of the present disclosure.

FIG. 19 is a schematic view showing different configurations 1 to 4 of the antenna module 2 of the second embodiment. The configuration 1 is a structure as shown in FIG. 18. The lengths and the widths W of the first open grooves 224*a* and the second open grooves 224*b* of the configuration 1 to the configuration 4 of the second embodiment are the same as the lengths and the widths W of the configuration 1 to the configuration 4 of the first embodiment.

Figure 20:
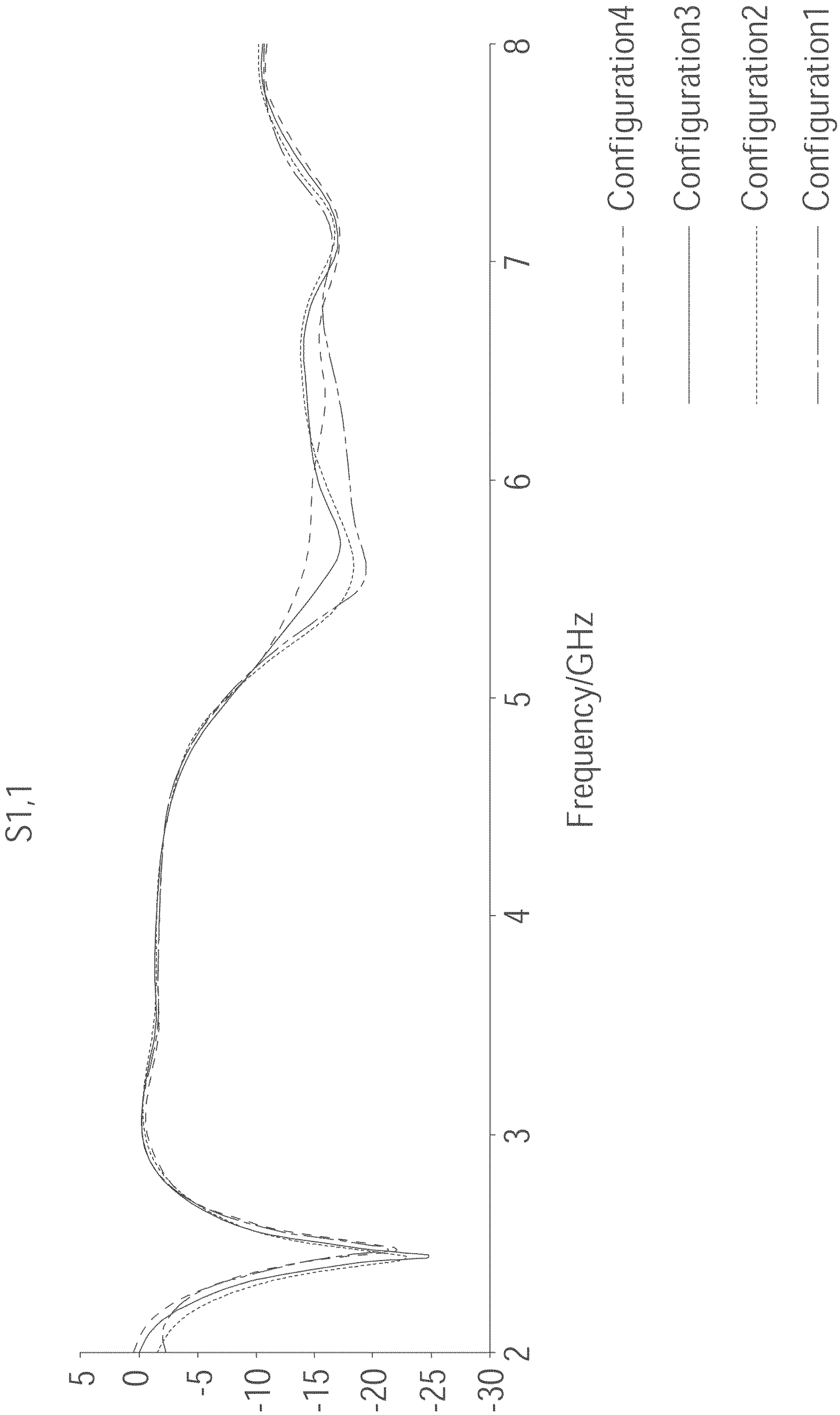
FIG. 20 is a schematic view showing S1,1 of the configuration 1 to configuration 4 in FIG. 19.
Figure 21:
FIG. 21 is a schematic view showing S2,1 of the configuration 1 to configuration 4 in FIG. 19.

FIG. 20 is a schematic view showing S1,1, i.e., a return loss, of the configuration 1 to the configuration 4 of the second embodiment, wherein S1,1 corresponds to the first antenna 102. FIG. 21 is a schematic view showing S2,1 of the configuration 1 to the configuration 4 of the second embodiment, wherein S2,1 is the isolation between the first antenna 102 and the second antenna 104. As shown in Table 4, the isolation could be enhanced along with the increase in the first length L1 and the second length L2. It must be pointed out that the isolation at 2.45 GHz of the configuration 1 is the best.

TABLE 4 the isolations of the configuration 1 to the configuration 4 and a comparative example

| | Configuration 1 | Configuration 2 | Configuration 3 | Configuration 4 | Comparative example |
|---|---|---|---|---|---|
| 2.45 GHz - isolation (dB) | −41.898 | −30.354 | −22.587 | −19.442 | −19.446 |
| 5.5 GHz - isolation (dB) | −24.782 | −21.734 | −22.115 | −22.095 | −18.884 |

Figure 22:
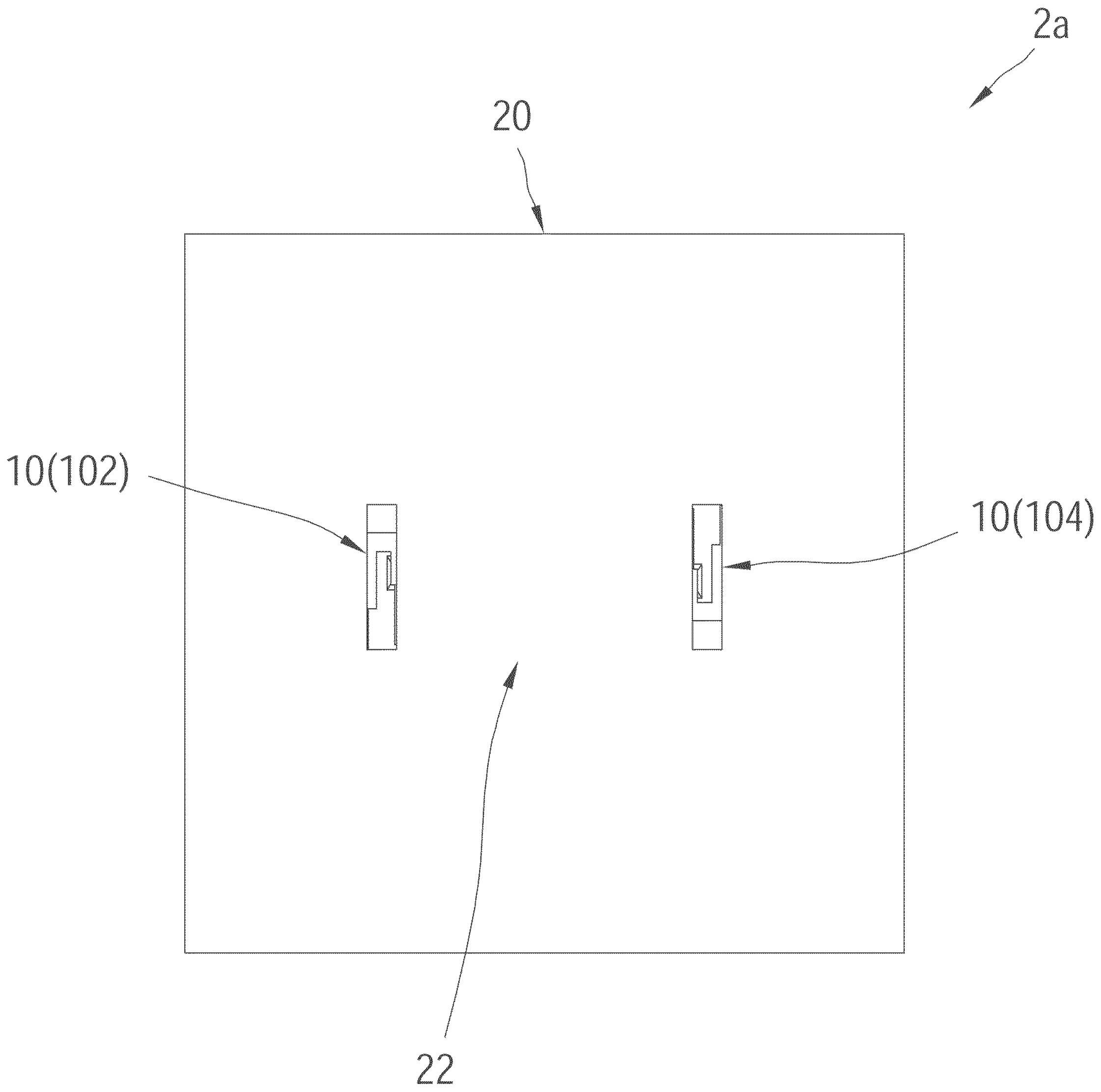
FIG. 22 is a schematic view of the antenna module according to another comparative example of the present disclosure.
Figure 23:
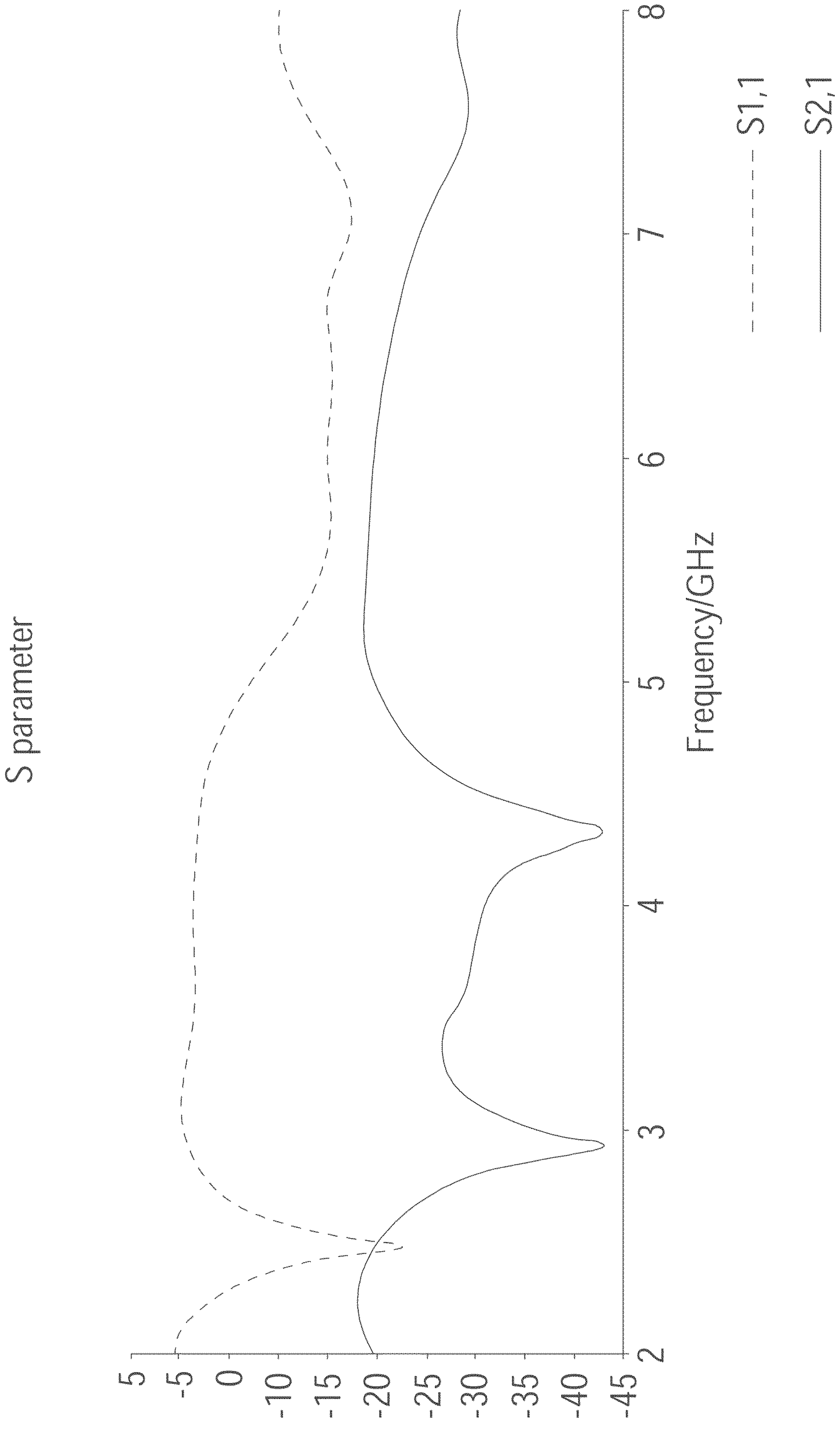
FIG. 23 is a schematic view showing S1,1 and S2,1 of the another comparative example in FIG. 22.

To compare the effect of the open grooves 224 on the isolation, an antenna module 2*a* of a comparative example, of which the spacing zone 22 is provided without the open grooves 224, is illustrated in FIG. 22. FIG. 23 is a schematic view showing S1,1 and S2,1 of the antenna module 2*a* of the comparative example. The isolations at 2.45 GHz and at 5.5 GHz of the comparative example are also listed in Table 4 for comparison. It could be obviously seen from Table 4 that the isolation of the configuration 1 to the configuration 4 is much enhanced comparing with the comparative example that is provided without the open groove. Although the isolation at 2.45 GHz of the configuration 4 is similar to the isolation at 2.45 GHz of the comparative example, the isolation at 5.5 GHz of the configuration 4 is better than the isolation at 5.5 GHz of the comparative example.

Figure 24:
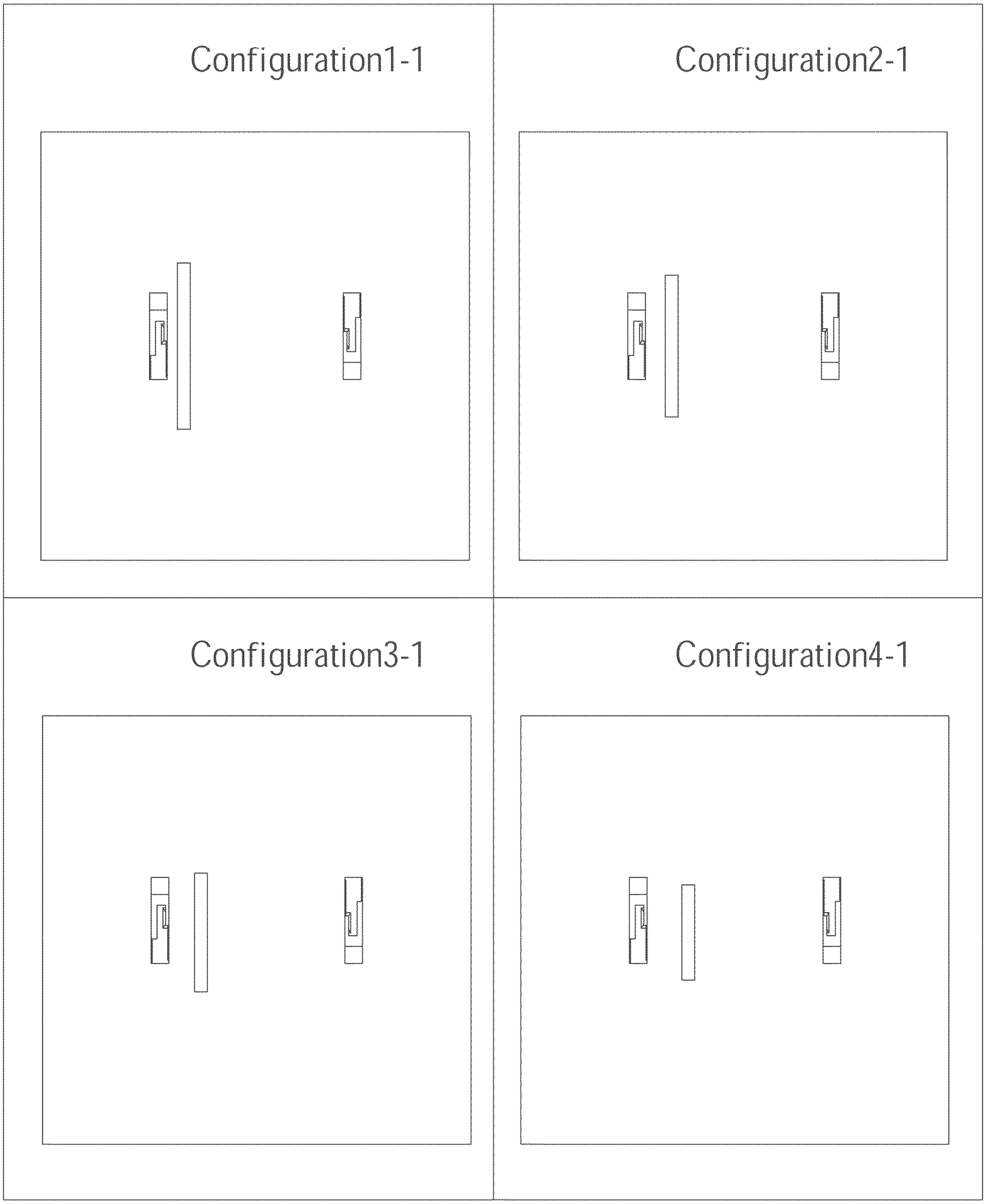
FIG. 24 is a schematic view showing the configuration 1-1 to the configuration 4-1 of the antenna module according to the second embodiment of the present disclosure.
Figure 25:
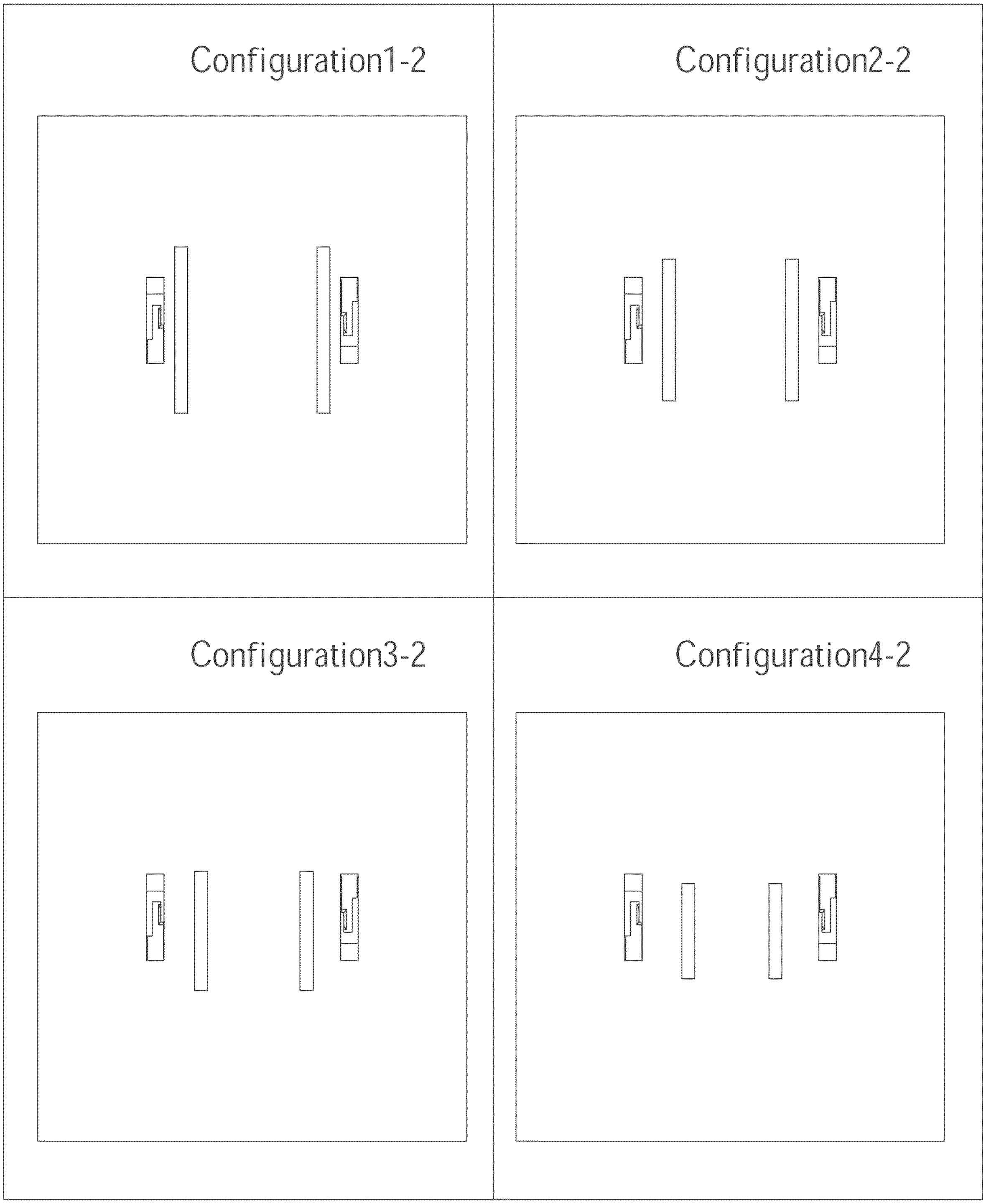
FIG. 25 is a schematic view showing the configuration 1-2 to the configuration 4-2 of the antenna module according to the second embodiment of the present disclosure.
Figure 26:
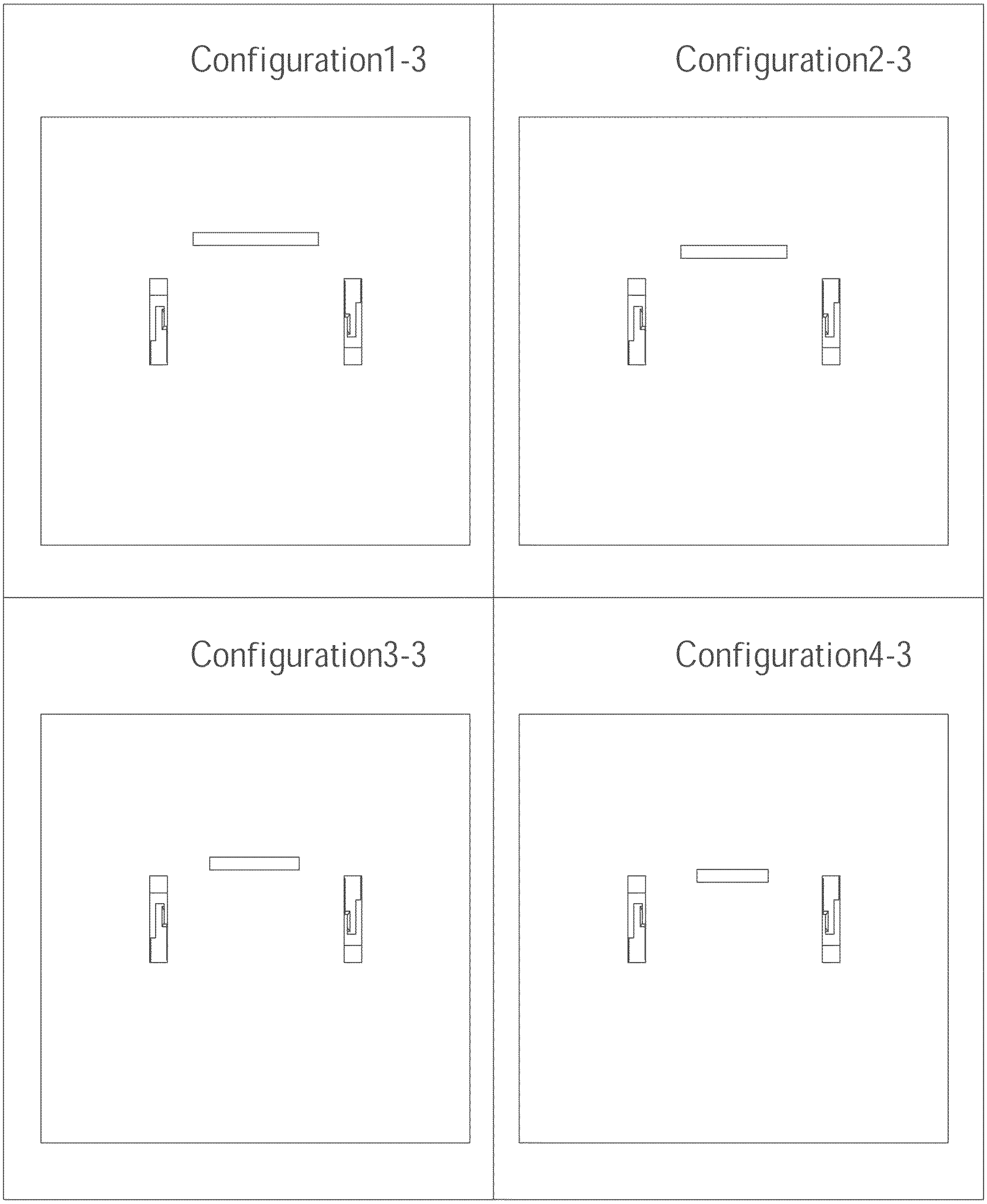
FIG. 26 is a schematic view showing the configuration 1-3 to the configuration 4-3 of the antenna module according to the second embodiment of the present disclosure.
Figure 27:
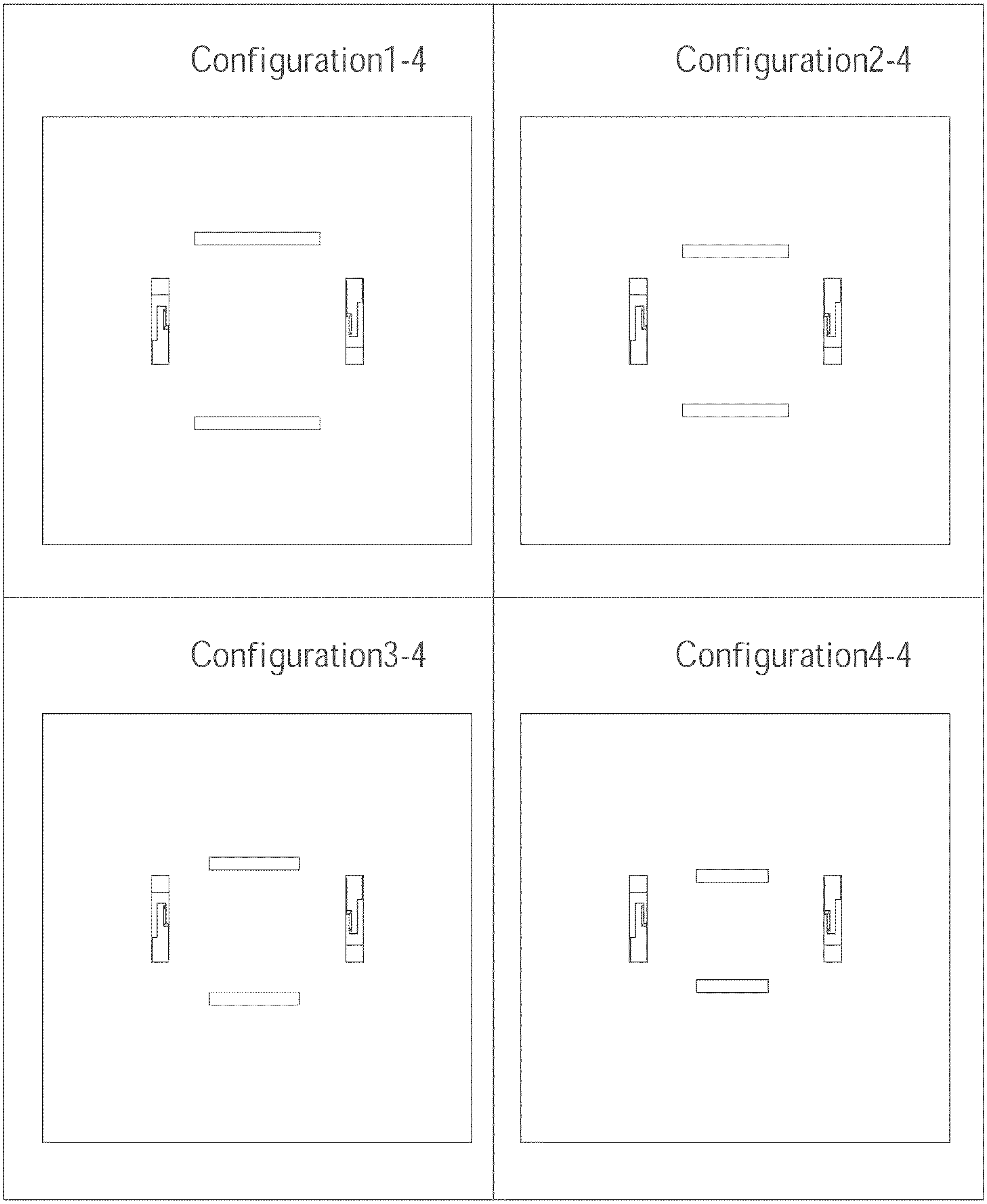
FIG. 27 is a schematic view showing the configuration 1-4 to the configuration 4-4 of the antenna module according to the second embodiment of the present disclosure.

To compare the effect of the number of the open grooves 224 on the isolation, a plurality of configurations 1-1 to 4-4 with different number of the open grooves 224 and corresponding to the configuration 1 to the configuration 4 of the second embodiment are provided as shown in FIG. 24 to FIG. 27. The first length L1 and the second length L2 of each of the configurations 1-1 to 4-4 are listed in Table 1. As shown in FIG. 24, the configuration 1-1 to the configuration 4-1 are provided with one first open groove 224*a*. As shown in FIG. 25, the configuration 1-2 to the configuration 4-2 are provided with two first open grooves 224*a*. As shown in FIG. 26, the configuration 1-3 to the configuration 4-3 are provided with one second open groove 224*b*. As shown in FIG. 27, the configuration 1-4 to the configuration 4-4 are provided with two second open grooves 224*b*. The isolations of the configurations 1-1 to 4-4 shown in FIG. 24 to FIG. 27 are listed in Table 5.

TABLE 5 the isolations of the configuration 1-1 to the configuration 4-4 and the comparative example

| | Configuration 1-1 | Configuration 2-1 | Configuration 3-1 | Configuration 4-1 | Comparative example |
|---|---|---|---|---|---|
| 2.45 GHz - isolation (dB) | −28.929 | −26.674 | −20.664 | −20.265 | −19.446 |
| 5.5 GHz - isolation (dB) | −21.346 | −21.054 | −21.255 | −21.117 | −18.884 |
| | Configuration 1-2 | Configuration 2-2 | Configuration 3-2 | Configuration 4-2 | Comparative example |
| 2.45 GHz - isolation (dB) | −30.522 | −33.304 | −21.551 | −20.005 | −19.446 |
| 5.5 GHz - isolation (dB) | −23.72 | −22.881 | −22.739 | −22.251 | −18.884 |
| | Configuration 1-3 | Configuration 2-3 | Configuration 3-3 | Configuration 4-3 | Comparative example |
| 2.45 GHz - isolation (dB) | −19.172 | −20.512 | −20.7 | −20.666 | −19.446 |
| 5.5 GHz - isolation (dB) | −20.545 | −18.952 | −19.441 | −19.534 | −18.884 |
| | Configuration 1-4 | Configuration 2-4 | Configuration 3-4 | Configuration 4-4 | Comparative example |
| 2.45 GHz - isolation (dB) | −19.202 | −20.132 | −20.557 | −20.68 | −19.446 |
| 5.5 GHz - isolation (dB) | −22.44 | −18.804 | −19.199 | −19.264 | −18.884 |

It could be seen form Table 5, one open groove 224 (i.e., the configuration 1-1 to the configuration 4-1 or the configuration 1-3 to the configuration 4-3) could enhance the isolation. The isolation effect of one first open groove 224*a* (i.e., the configuration 1-1 to the configuration 4-1) is better than the isolation effect of one second open groove 224*b* (i.e., the configuration 1-3 to the configuration 4-3). Two first open grooves 224*a* (i.e., the configuration 1-2 to the configuration 4-2) or two second open grooves 224*b* (i.e., the configuration 1-4 to the configuration 4-4) could also enhance the isolation, wherein the isolation effect of two first open grooves 224*a* (i.e., the configuration 1-2 to the configuration 4-2) is similar to the isolation effect of four open grooves 224 (i.e., the configuration 1 to the configuration 4). When the longitudinal directions of the open grooves 224 and the longitudinal directions of the antennas 10 are parallel, the isolation effect is better.

Although the isolation at 2.45 GHz of the configuration 1-3 and the isolation at 2.45 GHz of the configuration 1-4 are similar to the isolation at 2.45 GHz of the comparative example, the isolation at 5.5 GHz of the configuration 1-3 and the isolation at 5.5 GHz of the configuration 1-4 are still better than the isolation at 5.5 GHZ of the comparative example.

Additionally, when the antenna module 2 of the second embodiment does not serve as a shielding cover for shielding, the extending plates 30 could also be removed. In other words, one or a plurality of open grooves 224 could be disposed in the spacing zone 22 to enhance the isolation between the two antennas 10.

With the aforementioned design, the antenna modules of the present disclosure have the extending plates and the shielding portions which could be the shielding cover of the electronic component. Additionally, through the at least one open groove being disposed in the spacing zone, the isolation between the two antennas could be enhanced.

It must be pointed out that the embodiments described above are only some preferred embodiments of the present disclosure. All equivalent structures which employ the concepts disclosed in this specification and the appended claims should fall within the scope of the present disclosure.

What is claimed is:

1. An antenna module, comprising:

two antennas;

a reflecting board having a first surface and a second surface opposite to the first surface, wherein the first surface extends along a first axis and a second axis; the first axis is perpendicular to the second axis; the two antennas are disposed on the first surface and are spaced along the first axis; a spacing zone is defined in the reflecting board, wherein the spacing zone is located between the two antennas and has a shielding portion; a periphery of the shielding portion has a plurality of open grooves, wherein each of the plurality of open grooves penetrates through the first surface and the second surface; the shielding portion has a plurality of side edges, wherein each of the plurality of side edges is adjacent to each of the plurality of open grooves; and a plurality of extending plates respectively connected to the plurality of side edges, wherein each of the plurality of extending plates extends towards the second surface;

wherein the shielding portion and the plurality of extending plates jointly form a shielding cover.

2. The antenna module as claimed in claim 1, wherein each of the plurality of extending plates is integrated with each of the plurality of side edges.

3. The antenna module as claimed in claim 2, wherein two of the plurality of extending plates facing each other respectively have an inner surface; the two inner surfaces of the two extending plates face each other; at least one positioning hole is disposed on each of the two inner surfaces.

4. The antenna module as claimed in claim 2, wherein each of the plurality of open grooves has a longitudinal direction and a lateral direction; each of the plurality of open grooves has a width along the lateral direction of each of the plurality of open grooves; each of the plurality of extending plates has a height along a third axis which is perpendicular to the first axis; the height is not greater than the width.

5. The antenna module as claimed in claim 4, wherein the plurality of open grooves comprise two first open grooves; the two first open grooves are spaced along the first axis; the longitudinal direction of each of the two first open grooves extends along the second axis.

6. The antenna module as claimed in claim 5, wherein a length of each of the two first open grooves along the longitudinal direction of each of the two first open grooves is a first length; the first length is between 37 mm and 73 mm; a distance between the two first open grooves along the first axis is between 27 mm and 55 mm.

7. The antenna module as claimed in claim 6, wherein the plurality of open grooves comprise two second open grooves; the two second open grooves are spaced along the second axis; the longitudinal direction of each of the two second open grooves extends along the first axis.

8. The antenna module as claimed in claim 7, wherein a length of each of the two second open grooves along the longitudinal direction of each of the two second open grooves is a second length; the second length is between 27 mm and 55 mm.

9. The antenna module as claimed in claim 6, wherein each of the two antennas has a longitudinal direction and a lateral direction; a distance between a center of one of the two antennas in the lateral direction of the antenna and a center of the other antenna in the lateral direction of the other antenna along the first axis is provided; the distance is between 80 mm and 135 mm.

10. The antenna module as claimed in claim 5, wherein each of the two antennas has a longitudinal direction; the longitudinal direction of each of the two antennas extends along the second axis.

11. An antenna module, comprising:

two antennas, wherein each of the two antennas has a longitudinal direction; and a reflecting board having a first surface and a second surface opposite to the first surface, wherein the first surface extends along a first axis and a second axis; the first axis is perpendicular to the second axis; the two antennas are disposed on the first surface and are spaced along the first axis; a spacing zone is defined in the reflecting board and is located between the two antennas; the spacing zone of the reflecting board has a plurality of open grooves, wherein each of the plurality of open grooves penetrates through the first surface and the second surface and has a longitudinal direction and a lateral direction; the longitudinal direction of each of the plurality of open grooves extends along the first axis or extends along the second axis; each of the plurality of open grooves is closed along the first axis and the second axis; when the longitudinal direction of each of the plurality of open grooves extends along the second axis, the longitudinal direction of each of the two antennas is parallel to the longitudinal direction of each of the plurality of open grooves, and two ends of each of the two antennas in the longitudinal direction of each of the two antennas are located between two ends of each of the plurality of open grooves in the longitudinal direction of each of the plurality of open grooves.

12. The antenna module as claimed in claim 11, wherein the plurality of open grooves comprises two open grooves; the two longitudinal directions of the two open grooves are parallel.

13. The antenna module as claimed in claim 11, wherein the plurality of open grooves comprises two first open grooves; the two first open grooves are spaced along the first axis; the longitudinal direction of each of the two first open grooves extends along the second axis.

14. The antenna module as claimed in claim 13, wherein a length of each of the two first open grooves along the longitudinal direction of each of the two first open grooves is a first length; the first length is between 37 mm and 73 mm; a distance between the two first open grooves along the first axis is between 27 mm and 55 mm.

15. The antenna module as claimed in claim 14, wherein the plurality of open grooves comprises two second open grooves; the two second open grooves are spaced along the second axis; the longitudinal direction of each of the two second open grooves extends along the first axis.

16. The antenna module as claimed in claim 15, wherein a length of each of the two second open grooves along the longitudinal direction of each of the two second open grooves is a second length; the second length is between 27 mm and 55 mm; the second length is three quarters times the first length.

17. The antenna module as claimed in claim 14, wherein each of the two antennas has a longitudinal direction and a lateral direction; a distance between a center of one of the two antennas in the lateral direction of the antenna and a center of the other antenna in the later direction of the other antenna along the first axis is provided; the distance is between 80 mm and 135 mm.

18. The antenna module as claimed in claim 13, wherein the longitudinal direction of each of the two antennas extends along the second axis.

* * * * *